US012282892B2

(12) United States Patent
Boyd et al.

(10) Patent No.: US 12,282,892 B2
(45) Date of Patent: *Apr. 22, 2025

(54) DATA-DRIVEN REQUIREMENTS ANALYSIS AND MATCHING

(71) Applicant: Sustainment Technologies, Inc., Austin, TX (US)

(72) Inventors: Bret Boyd, Bee Cave, TX (US); Michael Morford, The Colony, TX (US); Richard Hsueh-Yee Leu, Austin, TX (US); Joey Allen, Frisco, TX (US)

(73) Assignee: Sustainment Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,386

(22) Filed: Jun. 2, 2021

(65) Prior Publication Data
US 2022/0391821 A1 Dec. 8, 2022

(51) Int. Cl.
| | |
|---|---|
| G06Q 10/087 | (2023.01) |
| G06F 16/9535 | (2019.01) |
| G06N 20/00 | (2019.01) |
| H04L 67/133 | (2022.01) |

(52) U.S. Cl.
CPC ....... *G06Q 10/087* (2013.01); *G06F 16/9535* (2019.01); *G06N 20/00* (2019.01); *H04L 67/133* (2022.05)

(58) Field of Classification Search
CPC .. G06Q 10/087; G06F 16/9535; G06N 20/00; H04L 67/133
See application file for complete search history.

(56) References Cited

U.S. PATENT DOCUMENTS

| | | | |
|---|---|---|---|
| 2007/0219653 A1* | 9/2007 | Martin | G06Q 10/10 700/90 |
| 2017/0235294 A1* | 8/2017 | Shapiro | B23K 37/0235 700/97 |
| 2019/0018391 A1* | 1/2019 | Rogers | G05B 19/4097 |
| 2021/0004589 A1* | 1/2021 | Turkelson | G06V 30/19173 |
| 2021/0133767 A1* | 5/2021 | Cox | G06F 30/20 |
| 2022/0067626 A1* | 3/2022 | Unnikrishnan | G06F 16/2465 |
| 2022/0107984 A1* | 4/2022 | Reed | G06Q 30/0224 |
| 2022/0206762 A1* | 6/2022 | Makhija | G06F 8/36 |

* cited by examiner

*Primary Examiner* — Florian M Zeender
*Assistant Examiner* — Kimberly S. Bursum
(74) *Attorney, Agent, or Firm* — KOKKA & BACKUS, PC

(57) ABSTRACT

Techniques for data-driven requirements analysis and matching are described, including receiving an input from a notification service using a data network, the input including data associated with a requirement generated by an application configured to identify an attribute of the item, querying an endpoint in response to the input, the input being associated with a machine in data communication with a platform, transforming the input, the data, and a result to a data format using a logic module to generate match data to identify a vendor capable of manufacturing at least a portion of the item, ranking and transforming the match data to a different data format to render a display of resultant data transmitted by the platform to the notification service for display on one or more client devices used to procure a manufacturing, procurement, or distribution service for the item.

18 Claims, 10 Drawing Sheets

DATA-DRIVEN REQUIREMENTS ANALYSIS AND MATCHING

FIELD

The present inventive subject matter relates generally to computer science, data science, data analytics, computer software, algorithmic analysis, and networked technologies for sourcing, procurement, manufacturing, and distribution in heavy industries and industries that involve complex and varied processes. More specifically, techniques for data-driven requirements analysis and matching are described.

BACKGROUND

With increasingly sophisticated and complex computational abilities due to increasingly powerful computer processors and software, many public and private entities and organizations are replacing older, manually-intensive processes and workflows. Benefits ranging from the distributed implementation of complex automated processes to the deployment of "artificial intelligence" or highly sophisticated logic or model-based algorithms, such as those found in machine learning, deep learning, and other advanced areas of computing, are enabling the automation of existing processes, accelerating performance (i.e., decreasing latencies), and increasing productivity. However, there are many industries that are slow to integrate with conventional techniques due to cost, time, personnel training and expertise, or complexity. Many participants in these sectors are also experiencing difficulty adopting or adapting to new technologies due to risks associated with changing existing processes or overcoming widespread incompatibilities and disparate technical standards, particularly by large enterprises such as those engaged in heavy industries. Heavy industries (i.e., industries dependent upon the procurement, manufacturing, and distribution of heavy or capital-intensive equipment or those that use such equipment to manufacture products) often have complex processes and considerations that affect how research is performed to identify manufacturing suppliers or vendors having matching capabilities for a given set of requirements are identified, raw material and resources meeting requirements, and many other problems, all of which contribute to the extensive time and cost in producing heavy industry goods. Using conventional applications and software, heavy industries lack compatibility between interconnected systems, often utilizing disparate machinery or equipment that are either interconnected or rely upon disparate data communication standards and protocols, which creates a substantial data interconnectivity problem for companies that typically manufacture a narrow range of parts, items, goods, or products.

For example, the production of a large passenger aircraft or vessel or the construction of a hydroelectric or desalinization facility may cost substantial amounts of capital, require thousands or millions of parts, which may require considerable time, expense, and knowledge (i.e., personnel experience and/or training) to procure a manufacturing supplier that can fulfill the contract for a given cost and timetable (i.e., schedule), to manufacture the necessary parts, or distribute them to a site location. In many instances, these projects may not only be capital intensive, but may be funded entirely or partially using private (e.g., angel investments, family and friends investments, or the like) or corporate (e.g., monies raised using public capital markets such as stock exchanges or the like or institutional investment from organizations such as venture capital, private equity, hedge, or corporate institutional investment funds) funding or public funds (i.e., proceeds from public taxes raised by regional, state, federal, national, or international bodies, entities, or organizations), all of which requires accountability, efficiency, and quality. Data generated in heavy industries could be useful to any public entity, organization (e.g., various types of governmental and non-governmental or non-profit), or corporation that needs to track the performance efficacy and efficiency in the use of funding. In such situations, conventional techniques are inefficient, complicated, expensive, and inaccurate.

Further, conventional techniques typically employ rudimentary forms of logic such as rules-based logic (i.e., a group of rules that are typically user-specified) or form-driven/forced workflow processes, which are typically inflexible, inaccurate, and time consuming when attempting to match manufacturing supplier capabilities to those of a requirement. This is often the result of disparate data sources, data types, data formats, limited training, and complexity of conventional techniques. Conventional techniques typically rely upon manual searching and evaluation of possible manufacturing suppliers capable of fulfilling a requirement, which is time consuming and expensive given the need for skilled personnel who are familiar with procurement processes as well as the applications and data flows required to locate a suitable manufacturing supplier.

Thus, what is needed is a solution for managing data in an efficient manner for heavy industry procurement, manufacturing, and distribution activities without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Figure 1:
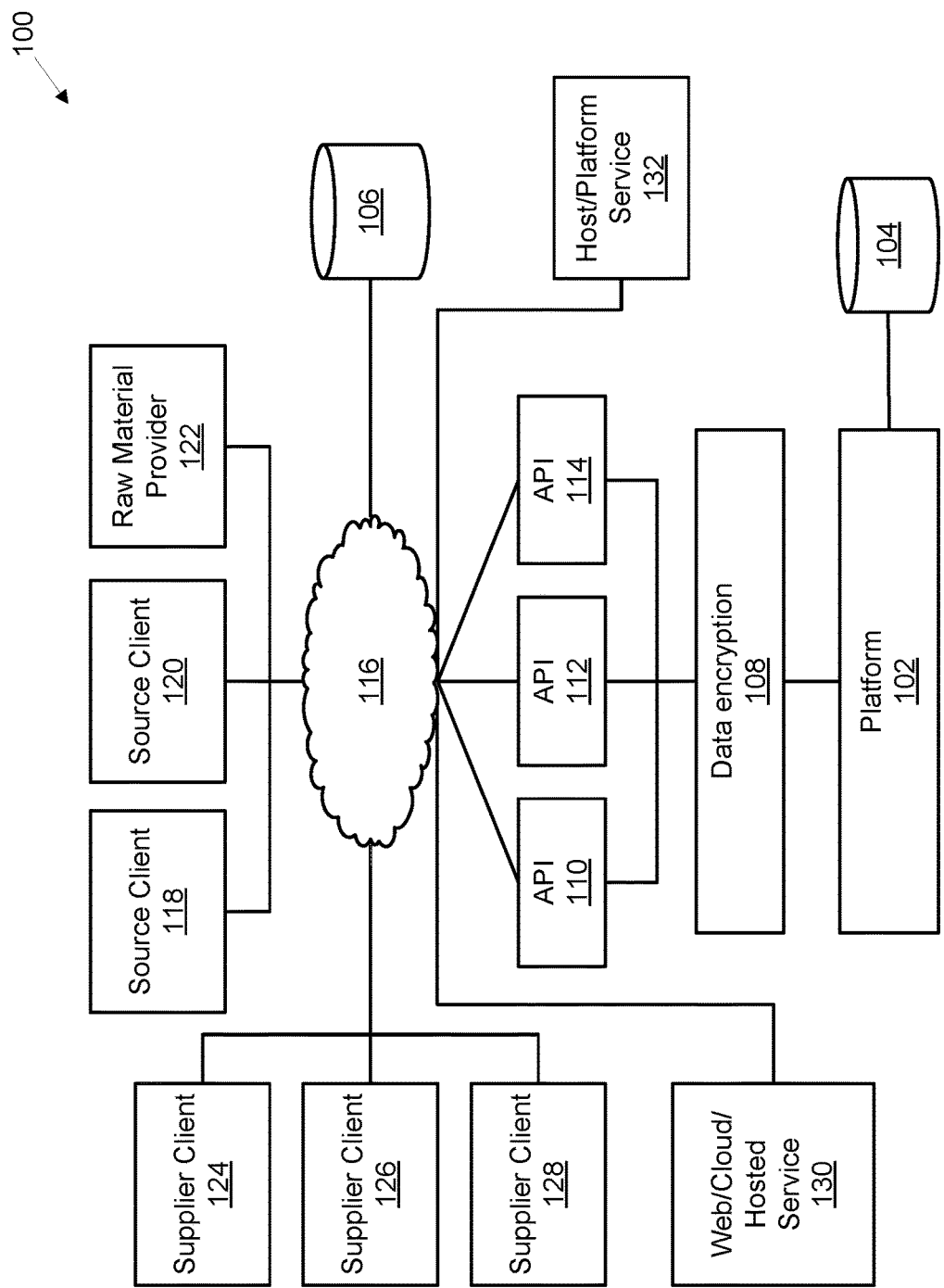
FIG. 1 illustrates an exemplary system for data-driven requirements analysis and matching.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language (e.g., JAVA®, JAVASCRIPT®, and others, without limitation or restriction), service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using, hosted on, served from, or otherwise implemented on one or more local, remote, and/or distributed data networks such as the Internet, one or more computing clouds (hereafter "cloud"), or others. Data networks (including computing clouds) may be implemented using various types of standalone, aggregated, or logically-grouped computing resources (e.g., computers, clients, servers, tablets, notebooks, smart phones, cell phones, mobile computing platforms or tablets, and the like) to provide a hosted environment for an application, software platform, operating system, software-as-a-service (i.e., "SaaS"), platform-as-a-service, hosted, or other computing/programming/formatting environments, such as those described herein, without restriction or limitation to any particular implementation, design, configuration, instance, version, build, or state. Distributed resources such as cloud computing networks (also referred to interchangeably as "computing clouds," "storage clouds," "cloud networks," or, simply, "clouds," without restriction or limitation to any particular implementation, design, configuration, instance, version, build, or state) may be used for processing and/or storage of varying quantities, types, structures, and formats of data, without restriction or limitation to any particular implementation, design, or configuration. In the drawings provided herewith, the relative sizes and shapes do not convey any limitations, restrictions, requirements, or dimensional constraints unless otherwise specified in the description and are provided for purposes of illustration only to display processes, data, data flow chart, application or program architecture or other symbols, as described in this Specification.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas and languages such as SQL®, MySQL®, NoSQL™, DynamoDB™, R, or others, such as those developed by proprietary and open source providers like Amazon® Web Services, Inc. of Seattle, Wash., Microsoft®, Oracle®, Google®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof, without limitation or restriction. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. Further, as described herein, disclosed processes implemented as software may be programmed using JAVA®, JAVASCRIPT®, Scala, Perl, Python™ XML, HTML, and other data formats and programming languages, without limitation. As used herein, references to layers of an application architecture (e.g., application layer or data layer) may refer to a stacked layer application architecture designed and configured using models such as the Open Systems Interconnect (OSI) model or others.

The described techniques may be implemented as a software-based application, platform, or schema. In some examples, machine or deep learning algorithms such as those used in computing fields associated with "artificial intelligence" may be used. While there is no particular dependency to a given type of algorithm (e.g., machine learning, deep learning, neural networks, intelligent agents, or any other type of algorithm that, through the use of computing machines, attempts to simulate or mimic certain attributes of natural intelligence such as cognitive problem solving, without limitation or restriction), there is likewise no requirement that only a single instance or type of a given algorithm be used in the descriptions that follow. Algorithms may be untrained or trained using model data, external data, internal data, or other sources of data that may be used to improve the accuracy of calculations performed to generate output data for use in applications, systems, or platforms in data communication with software module or engine-based implementations. The described techniques within this Detailed Description are not limited in implementation, design, function, operation, structure, configuration, specification, or other aspects and may be varied without limitation. The size, shape, quantity, configuration, function, or structure of the elements shown in the various drawings may be varied and are not limited to any specific implementations shown, which are provided for exemplary purposes of illustration and are not intended to be limiting.

FIG. 1 illustrates an exemplary system for data-driven requirements analysis and matching. Here, system 100 includes platform 102, data repositories 104 and 106 (e.g., database, data lake, data warehouse, data facility, data structure, or the like), data encryption layer 108, application programming interfaces (hereafter "API") 110-114, network 116 (e.g., a data network of any type, public or private, including a LAN, WAN, the Internet, the World Wide Web (hereafter "web"), MAN, a computing cloud (hereafter "cloud"), or any other type of logical, physical, and/or virtual aggregation of resources configured to communicate, transfer, process, or perform other data operations, without limitation or restriction), source clients 118-120, raw material provider 122, supplier clients 124-128, web/cloud/hosted service 130, and host/platform service 132. As shown, the number, type, configuration, implementation, and function of elements 102-132 of system 100 may be varied and are not limited to the examples shown and described, which are provided for purposes of illustrating the techniques described herein.

In some examples, platform 102 may be a hosted platform or service that is configured to host one or more computing functions, processes, and/or workflows to enable sources 118-120 to identify supplier clients 124-128 based on the output of matching and ranking algorithms and logic used to achieve quantitative thresholds or scores in order to identify matches for purposes of procuring, manufacturing, and/or distribution of a part or item. As used herein, "part" or "item" may be used interchangeably, without limitation or restriction, to refer to any type, quantity, configuration, size, shape, material, or function of production output of heavy industry. Further, "manufacturing supplier" may refer to any entity, company, corporation, or organization that offers or provides manufacturing services, capabilities, items/parts, or other services or goods that fulfill contracts awarded or offered by a source (e.g., source clients 118-120). The term "manufacturing supplier" may be used interchangeably with "vendor," or "supplier," throughout this specification, without limitation or restriction. Platform 102 may, in some examples, be implemented as single instance or as a logical grouping of computing resources distributed across various nodes (e.g., processors) such as those that may be connected via network 116 (e.g., cloud-based resources such as computing clouds, storage clouds, cloud-based servers (e.g., which may include a single server or a logical grouping of computing resources, threads, or processors, partially or entirely, that are aggregated or managed by an overall application or system such as those provided by Azure® of Microsoft Corporation of Redmond, Washington, Amazon Technologies, Inc. of Seattle, Washington, or others, without limitation or restriction). As shown, platform 102 may be implemented and configured to perform the techniques described herein that are used to algorithmically evaluate (i.e., analyze) various attributes associated with an item (hereafter "part" and "item" may be used interchangeably without distinction, restriction, or limitation) and a contract to be issued by one or more of source clients 118-120 to match capabilities, capacities, and other attributes of supplier clients 124-128 (e.g., machines and equipment (capital or non-capital) owned or operated by supplier clients 124-128) for purposes such as manufacturing, procurement, distribution (or manufactured items), resource planning (e.g., ERP), or the like, without restriction or limitation. Further, platform 102 may be configured to use, implement, provide, or otherwise work with one or more services, applications, or platforms by generating a data or service call to web/cloud/hosted service 130 or host/platform 132.

Data transferred by and between platform 102 and other elements 104-132 of system 100 may be encrypted using data encryption module 108, which may use one or more encryption techniques or algorithms such as hashes, private-public key, encryption key generation, DES, RSA, and many other types and standards. Platform 102 may be in data communication with one or more of elements 104-132 of system 100 and, when encrypted, data may be decrypted at destination/source endpoints such as source clients 118-120, raw material provider 122, supplier clients 124-128, web/cloud/hosted service 130, and/or host/platform service 132 using encryption/decryption algorithms or techniques such as those provided herein. Data transferred between platform 102 and elements 104-132 of system 100 may also be encrypted by APIs 110-114. APIs 110-114 may be implemented as standalone or distributed software components on platform 102 and one or more of source clients 118-120, raw material provider 122, and supplier clients 124-128. In some examples, source clients 118-120, raw material provider 122, and supplier clients 124-128 may be implemented as software applications using front-end user interfaces accessing applications or programs that are designed to cooperatively process data or signals (as used herein, "signals" may refer to any type of form, format, encapsulation, or packeting technique for communicating data, including any type of analog or digital signaling protocol) with platform 102. Applications such as web APIs (i.e., APIs that are implemented using one or more data communication protocols configured to transfer data over web-based interfaces such as hypertext transfer protocol (HTTP), Internet control protocol (IP), or any other including, but not limited, to those developed or recognized by the World Wide Web Consortium (W3C)) may be implemented throughout system 100 (e.g., at source clients 118-120, raw material provider 122, supplier clients 124-128, or any other client computing device accessing platform 102) and used to transfer data as an interface over, for example, a web browsing application (i.e., a "web browser" or any application configured to transfer data using any type of web-based data communication protocol) to platform 102.

Referring back to FIG. 1, APIs 110-114, regardless of whether implemented as a standalone or downloadable application, may be used to transfer data between one or more of source clients 118-120, raw material provider 122, supplier clients 124-128, web/cloud/hosted service 130, and/or host platform service 132. APIs 110-114 may also be implemented as web APIs, which are configured to be accessed using a web browser that, when directed to a specific Internet address or Uniform Resource Locator (hereafter "URL") may be used to call or invoke resources to configure, format, encrypt, decrypt, or perform other data operations to transfer data to/from platform 102. In some examples, a web API, may be used to transfer data securely (i.e., encrypted using data encryption module 108) between platform 102 over one or more data networks and/or computing clouds (e.g., network 116) to/from source clients 118-120, raw material provider 122, and supplier clients 124-128.

As shown here, source clients 118-120 may be configured to transmit data associated with a procurement, manufacturing (e.g., additive, subtractive, or others), or distribution requirement for an item over network 116 to platform 102. In some examples, source clients 118-120 may be computing systems or endpoints at a source (i.e., any type of organization or entity that generates one or more requirements for an item sought to fulfill a given contract (or portion thereof)). For example, a source may be a federal agency, a state department, a regional/county department, a local governmental body, a non-governmental organization, a corporate entity, or the like. A source may also be a contractor or sub-contractor that is seeking to fulfill a requirement or set of requirements for a specific part or item and is, consequently, looking for one or more vendors (i.e., suppliers) to fulfill said requirement. In some examples, platform 102 may also be configured to enable communication functions and functionality to facilitate data sharing between businesses (e.g., manufacturing suppliers, contract awarding sources, corporations with contracts seeking manufacturing suppliers, and others, without limitation or restriction) that use some, all, or part of system 100. For example, data may be transferred indirectly or directly, using platform 102, between source clients 118-120, raw material provider 122, and supplier clients 124-128. As another example, a single organization may have both source and supplier users (i.e., a single corporation, governmental agency, non-governmental organization, non-profit organization, small or medium-size business (i.e., "SMB"), or others, without limitation or restriction) that use one or more of source clients 118-120 and supplier clients 124-128. In other examples, raw material provider 122 may also have source clients and supplier clients similar to the examples provided above. Data transferred between source clients 118-120, raw material provider 122, and supplier clients 124-128 may be used for various purposes including discovery (i.e., of data and information associated with sources, suppliers, and raw material providers), comparison (e.g., of contracts, items or parts, raw materials, contracts, specifications, dimensions, or other types of requirements, without limitation or restriction), communication, collaboration (e.g., multiple suppliers collaborating or engaging as partners to fulfill a given contract awarded by one or more sources (e.g., sources 118-120)), or other functions or features that are enabled by data capabilities of platform 102, without limitation or restriction.

As used herein, supplier clients 124-128 may refer to any type of endpoint computing client associated with a supplier having one or more capabilities, capacities, or other attributes related to procurement, manufacturing, or distribution of an item in accordance with one or more requirements promulgated by a source (i.e., as requirements data transferred through source clients 118-120). In other examples, source clients 118-120 and supplier clients 124-128 may be implemented differently and are not limited to the examples shown and described. Further, raw material provider 122 may be another type of client or user (in addition to source clients 118-120 and supplier clients 124-128) that may be configured to transfer data over data network 116 over one or more of APIs 110-114 to platform 102. As used herein, "raw material provider" may refer to any type of company, corporation, organization, department, agency, individual, or entity that provides "raw material" (i.e., any type of goods, parts, items, or materials, regardless of whether in pure, impure, refined, unrefined, manufactured, assembled, or unassembled state) sought by source clients 118-120 to be used in fulfillment of a given contract awarded to one or more of supplier clients 124-128. For example, source client 118 may offer a contract to supplier clients 124-128 to build a large satellite and launch vehicle intended for launch and placement in low orbit around the planet Mars to survey for the presence of specific chemicals or compounds identified using a Cesium laser and diode array. Raw material provider 122 may be a corporation that operates a mine that obtains and refines Cesium to a quality suitable for scientific applications and, using system 100 through raw material provider 122 (which may be implemented as a computing device client that is accessible by the corporation's users (e.g., directors, officers, employees, independent contractors, consultants, or others)) may be able to "discover" (i.e., search, find, query, or retrieve data) the exemplary contract and communicate with both source client 118 and one or more of supplier clients 124-128 in order to provide (i.e., transfer, upload, transmit, or the like) data offering available raw material (e.g., Cesium) and data related thereto. In some examples, data transferred between raw material provider 122 and platform 102 may also have data protection implemented data encryption module 108. As described herein, any of source clients 118-120, raw material provider 122, or supplier clients 124-128 may be configured to use APIs 124-128 or call a remote service such as a web-based API (i.e., a "web API"). In other examples, an API may also be implemented by calling a remote service provided or served by web/cloud/hosted service 130 or host/platform service 132. For example, a remote or cloud-based hosted services provider such as Azure® of Microsoft Corporation may be used to provide one or more services that are managed by platform 102 but hosted on servers that may not be co-located with it.

As described herein, data may be input at one or more user interfaces (not shown) implemented on source clients 118-120 and converted or encapsulated using various types of structured or unstructured programming languages such as Java®, JavaScript®, C, C++, or others, without limitation or restriction. When received by platform 102, received data (not shown) may be transformed (i.e., converted from one format to another, regardless of whether directly or on a cached copy of the received data, which may be stored in one or more of data repositories 104-106 (e.g., in direct or indirect data communication with platform 102)) for platform 102 to receive and provide as input data or signals to a processing module or engine (not shown) to match, rank, or perform other operations against attributes (e.g., characteristics or attributes of equipment, machinery, processes, data workflows, organizational structure, or other information) provided by supplier clients 124-128. In other words, platform 102 may be designed, configured, and implemented to process data from source clients 118-120 in order to match, rank, and perform other data operations to efficiently identify and allocate procurement, manufacturing, and/or distribution capabilities, capacities, and resources to supplier clients 124-128. Platform 102, in some examples, may be implemented to partially or entirely eliminate latencies in matching a requirement (e.g., procurement, manufacturing, distribution, or others) generated from source clients 118-120 to one or more suppliers (e.g., supplier clients 124-128) using various attributes.

In some examples, platform 102 may be configured to provide different types of implementation techniques for matching requirements (as used herein, "requirement" may refer to any type of part, item, or material attribute or characteristic that is required, desired, or wanted for procurement, manufacturing, distribution, or other related-purposes) to one or more supplier with preferred or necessary capabilities and capacities (i.e., machines owned, leased, accessed, or operated by a given supplier). For example, platform 102 may be configured to receive a requirement from one or more of source clients 118-120, parse the requirement (i.e., perform data operations to use data included in the requirement for use by another software, program, application, module, engine, or service) and convert requirement data (i.e., data associated with a requirement from a source (e.g., source clients 118-120)) to a common data format (e.g., R, SQL, NoSQL, or other structured or unstructured data programming or formatting languages, formats, and schemas used for data science purposes, without limitation or restriction). Once transformed to a common data format, platform 102 may be configured to map data (i.e., received, handled, stored, cached, or otherwise processed according to one or more data models stored in data repositories 104-106 and accessed by platform 102) to one or more domain models (not shown). For example, data models may be used to determine how data received by platform 102 is stored, organized, archived, accessed, or otherwise used when stored in an internal data structure (e.g., data repository 104) or a remote, networked, or external data structure (e.g., data repository 106). Further, using a common data format such as R, RDF, or others, platform 102 can perform similar operations on data received from supplier clients 124-128. Further, other data associated with supplier clients 124-128 may be stored in one or more of data repositories 104-106. In some examples, data may have been received from prior operations in which data from source clients 118-120, raw material provider 122, and supplier clients 124-128 were matched, ranked, or otherwise operated upon. Still further, data from sources other than source clients 118-120, raw material provider 122, and supplier clients 124-128, but pertinent to capabilities, capacities, or other attributes of source clients 118-120, raw material provider 122, and supplier clients 124-128 may also be stored in data repositories 104-106 and used by platform 102.

For example, information catalogs, physical and virtual (e.g., digitally reproduced, stored, created, displayed, or otherwise presented) may provide information related to specific items for a given project. Procurement, manufacturing, and distribution requirements may be identified in data catalogs, databases, and such stored in data repositories 104-106. One or more of source clients 118-120 may be generating continuous requirements or sets of requirements for heavy industry projects on a continuous basis and, as the requirements or sets of requirements are generated, these can be stored in data repositories 104-106 and automatically or semi-automatically matched to supplier clients 124-128, providing ranked data back to source clients 118-120. Also, data and metadata describing the capabilities, capacities, or other attributes (e.g., manufacturing tolerances, capacities, quality assurance levels, and others, without limitation or restriction) may also be stored in data repositories 104-106.

When data from source clients 118-120 is received indicating a requirement for procurement, manufacturing, and/or distribution of an item is sought, platform 102 may be used to store one or more copies of the requirement and perform any type of data operation, without limitation or restriction, using various computer programming (hereafter "programming," which may be used interchangeably with coding (i.e., development of computer software code)) and/or formatting languages, data structures, forms, or formats. Using modules, engines, and algorithms such as those described below, platform 102 can also access data from supplier clients 124-128 that has also been transformed using a common data language, form, format, schema, or model and stored in data repositories 104-106. Using any type of data operation for performing statistical analyses and data comparisons, platform 102 can match the transformed requirements data to supplier data (e.g., data from supplier clients 124-128 for procurement, manufacturing, distribution, or other purposes) and generate a ranking for presenting one or more displays (not shown) at source clients 118-120. In other examples, platform 102 may also be configured to generate automatic responses providing supplier data in response to a contract issuance (i.e., an electronic notification that source clients 118-120 are releasing or issuing a contract for award for an item or project (i.e., a set of items and services intended to fulfill a specific set of requirements)) notification, which may be provided by an international, national, state, provincial, regional, local, or other governmental body, non-governmental organization, corporate entity, or others, without limitation or restriction.

In further examples, one or more services may be called (i.e., invoked, run, or otherwise implemented) by platform 102 to perform data operations that enable the matching of requirements data to supplier data. For example, a service may be called from one or more of web/cloud/hosted service 130 or host/platform 102 such as API. Other types of services may be called (i.e., invoked remotely by platform 102 by sending a service call (i.e., data or signals to web/cloud/hosted service 130, host/platform service 132)) to invoke a run-time instance of a given service, application, module, engine, or other computing function that may be used or managed by platform 102. In other examples, system 100, platform 102, and elements 104-132 may be designed, configured, or implemented differently and are not limited to the types, numbers, quantities, configurations, descriptions, designs, implementations, or other characteristics described herein and may be varied beyond the examples shown and described.

Figure 2A:
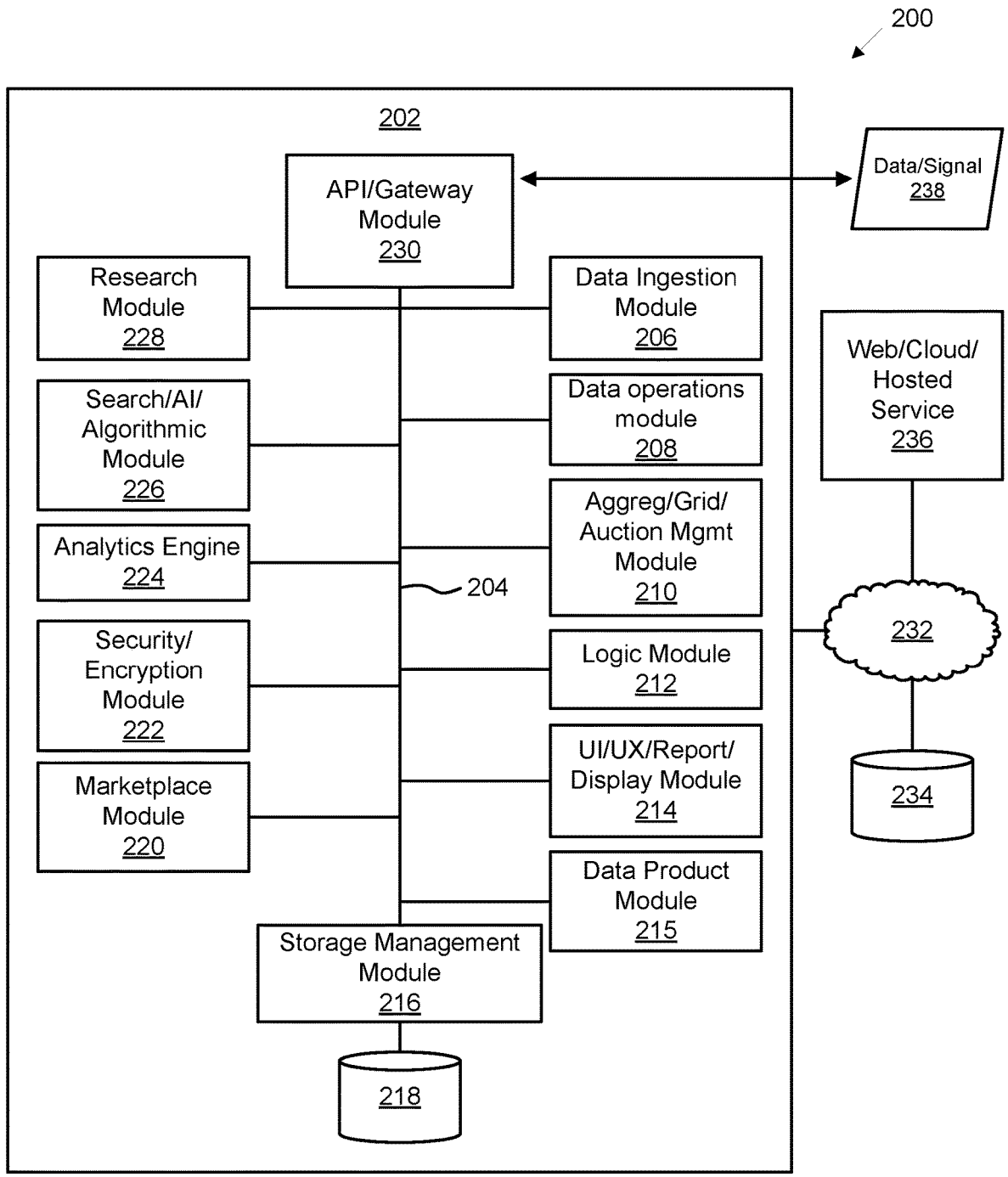
FIG. 2A illustrates an exemplary platform architecture for data-driven requirements analysis and matching.

FIG. 2A illustrates an exemplary platform architecture for data-driven requirements analysis and matching. Here, platform architecture 200 includes platform 202, data bus 204, data ingestion module 206, data operations module 208, aggregator/grid/auction management module 210, logic module 212, UI/UX/report module 214, data product 215, storage management module 216, data repository 218, marketplace module 220, security/encryption module 222, analytics engine 224, search/AI/algorithmic module 226, research module 228, API/Gateway module 230, data network 232, data repository 234, and web/cloud/hosted service module 236. Data/signal 236, which may be any type of data, signal, or signaled data (e.g., digital, analog, optical, or the like) is transferred to/from platform 102. As shown, platform 102 includes several software modules and engines configured to perform various functions in order to evaluate data associated with an item requirement and various attributes of suppliers providing equipment, machinery, or other capabilities and capacities in support of procurement, manufacturing, or distribution activities. The number, type, configuration, design, or implementation of these software modules and engines (i.e., elements 202-230) may be varied and are not limited to the examples shown and described.

Here, data/signal 238 may be received by or sent from platform 202 using API/Gateway module 230. In some examples, once data/signal 238 is received by platform 202 using API/Gateway module 230, transfer of data may be performed with other modules (e.g., data ingestion module 206, data operations module 208, aggregator/grid/auction management module 210, logic module 212, UI/UX/report module 214, data product 215, storage management module 216, data repository 218, marketplace module 220, security/encryption module 222, analytics engine 224, search/AI/algorithmic module 226, research module 228) or elements (e.g., data network 232, data repository 234, and web/cloud/hosted service module 236) to perform other data operations and processing. For example, data ingestion module 206 may be configured to ingest data received from API/Gateway module 230 in order to identify a data format, schema, or protocol by which data/signal 238 is received from API/Gateway module 230 as an initial or first format. After performing ingestion processes to identify initial attributes of data/signal 238, data may be transferred over data bus 204 to data operations module 208, which may be configured to perform data operations (e.g., copying, querying, retrieving, writing, reading, deleting, adding, modifying, or others, without limitation or restriction) or processing in order to further map data/signal 238 to one or more data models, some of which may be stored locally in data repository 218 or in a remote, distributed, or networked repository (e.g., data repository 234, which is coupled to data network 232 and platform 202), either or both types of which may be in data communication using various types and specifications of networking modules, equipment, devices, or other apparati or processes, without restriction or limitation (not shown).

After parsing and performing initial processing of requirement data associated with an item (i.e., described or transferred as payload data in data/signal 238), data operations may be performed using any type of programming language, form, format, or data schema for structured or unstructured data, without limitation or restriction. Once resolved into a data format, type, or other condition usable by platform 202, data operations may be performed on data/signal 238 to yield data that may be input for other processing functions into one or more of data ingestion module 206, data operations module 208, aggregator/grid/auction management module 210, logic module 212, UI/UX/report module 214, data product 215, storage management module 216, data repository 218, marketplace module 220, security/encryption module 222, analytics engine 224, search/AI/algorithmic module 226, or research module 228. For example, data from a source originating a requirement for an item (i.e., a part, portion, or an entire product) may be evaluated by logic module 212, analytics engine 224, and search/AI/algorithmic module 226 to use various types of algorithms such as machine learning, deep learning, and many others to identify one or more data attributes or characteristics (hereafter "attributes") associated with and assigned to the requirement. Data describing attributes may be stored in data repository 218 and/or data repository 234 (hereafter "data repository" and "repository" may be used interchangeably), which may be implemented using one or more data structures configured to store data such as a database, data lake, data warehouse, data facility, data cloud, storage cloud, or others, without restriction or limitation. Data associated with prior source-originated requirements, parts, items, suppliers, machines (e.g., computer numerically controlled machines that may be network-configured to perform data communication with functions with other machines, equipment, processes, applications, software, platforms, or other items that may be described as "Internet of Things" (hereafter IoT)-enabled), and other inputs to platform 202 may be stored in repositories 218 or 234 and later queried, accessed, retrieved, copied, cached, or otherwise processed in order to train search/AI/algorithmic module 226 as a source of internal or external training data.

Attributes, once determined, may then be used by logic module 212, analytics engine 224, search/AI/algorithmic module 226, and/or research module 228 to generate queries of supplier data and attributes stored in repositories 218 or 234 in order to identify matched attributes of suppliers and generate rankings thereof. For example, a requirement parsed and processed from data/signal 238 may indicate a machining requirement for a specific dimensional tolerance, material, or machine to be used in manufacturing an item. Platform 202, using logic module 212, search/AI/algorithmic module 226, and research module 228 may generate a query to request data from repository 218 that meets or exceeds a quantitative threshold for suppliers having the capabilities and capacities to manufacture an item to the identified requirement. In some examples, research module 228 may be configured to perform searches for data related to contracts, contract awards, or other data originated by or related to source clients 118-120 (FIG. 1). Research module 228 may also be configured to search data originated by or related to raw material provider 122 (FIG. 1) and/or supplier clients 124-128 (FIG. 1). Research module 228 may be configure any type of sourcing, procurement, manufacturing, or distribution-related data or information searches including, but not limited to, government-related market research ("market research"). Research module 228, which may be referred to as a "manufacturing search engine" may be configured to perform research in private and public industries, but also government-related market research. For example, the United States Department of Defense ("DoD") may refer to market research activities such as supplier discovery based on researching and searching for data related to vendors and suppliers for a given item, part, or contract, or others, without limitation or restriction. Platform 202, using research module 228 may be configured to perform this research for public, private, and governmental entities such as the DoD. Likewise, platform 202 may also be used to identify procurement or distribution-related matches from processed requirement data (e.g., data/signal 238). For example, a "demand" signal (i.e., a signal indicating a demand for a given requirement) may be processed by platform 202 using logic module 212, analytics engine 224, search/AI/algorithmic module 228, and research module 228 to identify a specific procurement process or contract desired for use in obtaining a contract award for manufacturing a specific item. Data identifying suppliers having experience or prior contract awards or contract performance criteria that meet these requirements may be identified by logic module 212, analytics engine 224, search/AI/algorithmic module 228, and/or research module 228, all of which individually or in combination may be configured to query repositories 218 and/or 234. Further, once identified, platform 202 may be configured to automatically generate a solicitation that is electronically transmitted on behalf of a source (i.e., an individual, entity, or organization) originating the requirement and further automated to bind a contract between the source and a supplier matching or surpassing the requirements data. In other examples, multiple suppliers matching or surpassing the requirements data indicated may also be presented on one or more displays associated with supplier clients 124-128 (FIG. 1) in a ranked order to be reviewed and selected by users of supplier clients 124-128.

In some examples, supplier data may be matched, ranked, and evaluated by analyzing requirement(s) data from source clients 118-120 (FIG. 1), which is subsequently ingested, parsed, and processed from data/signal 238 by data ingestion module 206, data operations module 208, logic module 212, analytics engine 224, search/AI/algorithmic module 226. When a requirement is detected (i.e., received, parsed, or processed by API/gateway module 230, data ingestion module 206, data operations module 208, or other elements of platform 202), logic module 212 and analytics engine 224 may be configured to perform analyses against the detected data for various purposes. For example, queries may be generated by analytics engine 224, search/AI/algorithmic module 226, and research module 228 and transmitted over data bus 204 to storage management module 216, which may be configured to parse, identify, and execute queries against one or more database (which may be implemented using any type of physical, virtual, or logical data storage type and topology) instances of data repositories 218 and 234. Data retrieved in response to queries may be matched to requirements data using various types of algorithmic, statistical, analytical, quantitative, or qualitative processes, including natural language processing, machine learning, deep learning, or other types, without restriction or limitation. Once matched, supplier data may be used to generate a ranking of suppliers associated with the requirement-to-supplier matched data using search/AI/algorithmic module 226. Matched requirement-to-supplier data may be used to identify various attributes of a given requirement(s) to identify one or more suppliers with procurement, manufacturing, or distribution attributes matching those sought. Procurement, manufacturing, or distribution attributes may be machine type, part or item type, output capacity, machining tolerances, availability, production time, lead time, personnel experience or attributes (e.g., security clearances, training certifications, degrees, education, or the like), and many others, without restriction or limitation.

In some examples, UI/UX/Display module 214 may be configured to process data output from logic module 212, analytics engine 224, search/AI/algorithmic module 228, and research module 228 for presentation on one or more endpoints (e.g., supplier clients 124-128 (FIG. 1), source clients 118-120 (FIG. 1), raw material provider 122 (FIG. 1)). For example, raw material provider 122 (FIG. 1) may receive a display of data that is presented within a client application that is configured to work with or act as a processing extension (i.e., whether as a downloadable, standalone application, a web or cloud service, or a combination thereof) of platform 202, presenting data associated with a requirement that indicates a specific material, amount, composition, or other attributes and which may be displayed in a digital form or format within a specific user interface (hereafter "UI") or user experience (hereafter "UX") on a screen or display at a client or computing endpoint associated with raw material provider 122.

As another example, source clients 118-120 (FIG. 1) may generate and send to platform 202 data that, once parsed by data operations module 208 and evaluated (i.e., analyzed) by logic module 212, analytics engine 224, search/AI/algorithmic module 226, indicates specific attribute data retrieved from data/signal 238 indicating various types of requirements related to procurement (e.g., the use of specific purchasing, accounting, financial, bidding, government contracting, security applications or other software), manufacturing, or distribution of an item. Regarding distribution, a requirement may be transmitted to platform 202 in data/signal 238 that indicates a specific type of transportation (e.g., rail, trucking, airborne, seaborne, and others) is to be used for an item from its manufacturing location to its destination. In other examples, data/signal 238 may also be used to indicate requirements for intermediate transportation means or mechanisms if an item is to be initially manufactured (e.g., shaped, formed, fabricated, milled, constructed, or the like) at one location, but completed at another. Still further, distribution data may also be transmitted as data/signal 238 that indicates how a given item is to be distributed at an intermediate, interim, semi-final, or final location, including to an ultimate consumer or user of an item. For example, an engine component that is desired to be procured, manufactured, and distributed to all aircraft within a specific fighter wing or squadron of the U.S. Air Force may be indicated as requirement data within data/signal 238 and, once received and processed by platform 202 and one or more modules or engines thereof (e.g., logic module 212, analytics engine 224, search/AI/algorithmic module 228, and research module 228, and others), suppliers having the capabilities, capacities, security clearances, machinery, prior contracting experience, or other attributes may be identified from prior stored supplier data in repositories 118 and/or 134 and displayed on source clients 118-120 (FIG. 1). In other examples, requirements data may also be displayed on supplier clients 124-128 (FIG. 2) to permit input data to be entered and sent back to platform 202 in response to query data transmitted over API/Gateway module 230. Various types of forms and formats may be used to present data to both source clients 118-120 (FIG. 1) and supplier clients 124-128 (FIG. 1).

In some examples, different types of presentation of data from platform 202 may be used to present (i.e., render a display on a client device or endpoint (e.g., source clients 118-120, raw material provider 122, supplier clients 124-128, or others)) requirements data or responsive data thereto. Referring back to FIG. 2, aggregator/grid/auction management module 210 and marketplace module 220 may be configured to process, format, and/or render for display requirements attributes and data (i.e., transformed, converted, or otherwise processed) from data/signal 238. Aggregator/grid/auction management module 210 and marketplace module 220 may be configured to present an aggregation of supplier data (i.e., when logic module 212, analytics engine 224, search/AI/algorithmic module 226, and research module are invoked) in different UI and/or UX designs, layouts, forms, and formats. In some examples, an aggregate listing of suppliers identified by querying repositories 218 and/or 234 for supplier data (i.e., data and attribute data (i.e., attributes) that were identified and processed by platform 202 and stored or that are identified by parsing and processing input data (e.g., data/signal 238)) may be generated by aggregator/grid/auction management module 210 and marketplace module 220 using input data (e.g., data from logic module 212, analytics engine 224, search/AI/algorithmic module 228, and research module 228, or others) over data bus 204 and input to UPUX/Report/Display module 214 in order to generate and present a digitally-rendered display (i.e., "display") on one or more clients (e.g., source clients 118-120, raw material provider 122, supplier clients 124-128, or others, without limitation or restriction). A listing, tiered structure, grid, or other graphical presentation may be used to present requirements, supplier, raw material, or other types of procurement, manufacturing, and distribution data may be presented and is not limited to the examples shown and described.

For example, when a requirement is detected and data/signal 238 is parsed and processed by platform 202, an auction-like presentation may be generated by aggregator/grid/auction management module 210 and marketplace module 220. Using an auction-like presentation, platform 202 may render a display to supplier clients 124-128 (FIG. 1) to permit them to enter data indicative of a bid. In some examples, if platform 202 detects data or attributes that indicate certain suppliers (e.g., supplier clients 124-128) have capabilities, capacities, or other characteristics that indicate the requirement(s) may be met, data is sent from logic module 212 and analytics engine 214 to aggregator/grid/auction management module 210 and marketplace module 220 to include the identified supplier in a rendered presentation of supplier data to the source of the requirement(s), which may be an aggregated display (e.g., a list, grid, or any type of structured, unstructured, ordered, or unordered presentation) of suppliers that are quantitatively, statistically, algorithmically (or a combination thereof) matched based on evaluation of attribute data determined (i.e., parsed and processed from) data signal 238. Other formats for presenting and/or handling data from a user experience or interface perspective include a grid format, which may be generated to graphically illustrate or highlight matching characteristics of suppliers based on supplier data evaluated as supplier attributes and those of source requirement(s) attributes and data. A grid, in some examples, may be used to illustrate geometrical relationships between attributes associated with a requirement(s) to those of a supplier (or multiple sources). Multiple grids may be rendered for display, each of which are intended to illustrate graphical relationships between multiple requirements and suppliers (based on supplier attributes and data). In other examples, grids may be generated by aggregator/grid/auction management module 210 and marketplace module 220 differently and are not limited to the examples shown and described.

Here, marketplace module 220 may also be implemented to, in combination with UI/UX/Report/Display module 214 to generate a "marketplace" or arrangement of data that may be in various forms including tabular, list, grid, graphical, or others, without restriction or limitation, and configured to present suppliers (and data and attributes thereof) for users of source clients 118-120 to peruse. For example, a project team uses endpoint devices (e.g., any type of computing device including, but not limited to desktop computers, laptops, smartphones, tablet computers, and others) to access source client 118 (or 120) in order to publish a requirement or set of requirements by providing data/signal 238 to platform 202 (using API/gateway module 230). After being ingested (i.e., by data ingestion module 206) and parsed (e.g., by data operations module 208, logic module 212, analytics engine 224, and/or search/AI/algorithmic module 226), marketplace module 220 and UI/UX/Report/Display module 214 may be configured to generate a UI/UX that renders a "marketplace" or display that presents data for various suppliers that may meet the capabilities, capacities, and other attributes required to meet the requirement(s). Using parsed data from a requirement sent to platform 202, search/AI/algorithmic module 226 and research module 228 may generate and send a data query using, for example, data science languages and formats such as R to storage management module 216. Storage management module 216, in some examples, may be implemented as an integrated data management layer, database management system (i.e., "DBMS"), standalone or remote data management application, or as a service that is configured to handle incoming query requests from one or more modules of platform 202. In some examples, storage management module 216 may also be configured to manage query requests that are generated and sent via network 232 to repository 234. In other examples, repositories 218 and 234 may be implemented using disparate, remotely located data storage facilities such as those described herein, including data lakes, data warehouses, databases, and the like. Storage management module 216 may handle incoming queries that are intended to identify data stored in a given format and, once retrieved, may be used to format retrieved data prior to transmission to one or more other elements of platform 202 over data bus 204. As an example, data stored in repository 218 may be retrieved by storage management module 216 in a data processing and storage schema (e.g., R, C, C#, C++, SQL, NoSQL, and others, without limitation or restriction), but then transform (i.e., convert or reformat the retrieved data) for use in rendering a presentation in a tabular-columnar format on a UI or UX generated by UI/UX/Report/Display module 214 using different programming and formatting languages, schemas, and protocols such as JavaScript®, HTML5, HTML, Bootstrap 4, Angular, TypeScript, Azure®, Visual Studio, ASP.Net, CSS (e.g., Cascading Style Sheet language of any version (e.g., CSS3)), cloud-based, Software-as-a-Service (SaaS), SQL, Amazon Web Services ("AWS"), and other proprietary and/or open source languages, platforms, and tools. The architecture, design, configuration, and implementation of storage management module 216 may be varied and is not limited to the examples shown and described.

Parsing and executing inputs from other modules requesting data, research module 228, as an example, may be configured to request data associated with attributes of suppliers that have a specific type of computer numerically controlled (hereafter "CNC"), network-enabled (i.e., IoT) machine. Data may be requested by research module 228 directly from supplier clients 124-128 (FIG. 1), source clients 118-120 (FIG. 1), raw material provider 122 (FIG. 1), or other endpoints or clients. Data may also be requested by research module 228 indirectly from stored data sources such as data repository 218 and 234, either or both of which may be in direct or indirect data communication. Attributes can be statistically or quantitatively matched to data and attributes of a given requirement(s) and, if a threshold, rule, level, or other data characteristic is met, a given supplier can be included in a marketplace (as well as other forms and formats of presenting a given supplier) generated and managed by marketplace module 220. Attributes associated or assigned to a supplier may include experience levels with procurement, manufacturing, or distribution of an item, personnel training levels with specific applications to security clearance levels and background checks for sensitive information, industrial classification codes, historical or real time pricing data, machinery specifications, manufacturing specifications, capacity output, machine tolerances, and many other attributes, without limitation or restriction, which can be either requested as data provided directly or indirectly from, for example, supplier clients 124-128 (FIG. 1) or queried of repositories 218 and/or 234. The rendered display and layout for a marketplace generated, formatted, and rendered (with UI/UX/report/display module 214) may be varied and is not limited to any specific design, layout, configuration, function or set of features, or implementation and is not limited to the examples shown and described.

As shown, various types of "data products" may also be implemented with platform 202 as data product 215. For example, search functionality may be implemented as a feature of platform 202 as a local or remote module or as a network or cloud-based service called from a web/cloud/hosted service 236, which may be implemented using services as Azure® from Microsoft®, Amazon Web Services®, Salesforce®, or others, without restriction or limitation. Other types of features or functionality may also be served from web/cloud/hosted service 236, including one or more of elements 206-230, which may be implemented as direct or indirectly installed components of platform 102, but also as virtual components or as services called from web/cloud/hosted service 236. In still other examples, data products 215 could be data aggregated by platform 202 and sold or licensed to other third parties, data analytics products that could be generated by analytics engine 224, but stored in repositories 218 and/or 234. Aggregated data on industrial performance of suppliers, sector forecasts, regional/national economic forecasting, identification of industrial base gaps, demand forecast-based planning, and other uses of data aggregated, generated, or stored by platform 202 may also be implemented or generated by data products module 215.

Still other data products could be "gatekeeper" functionality that is provided by platform 202 and used to prohibit supplier clients 124-128 (FIG. 1) from communicating with or contacting source clients 118-120 (FIG. 1) if data from the latter indicate attributes, characteristics, or criteria do not meet minimum thresholds or parameters for a match or are ranked too low. In other examples, "gatekeeper" may also refer to an implementation of platform 202 that manages all data from either source clients 118-120 (FIG. 1) and/or supplier clients 124-128, prohibiting direct data communication as to a particular requirement altogether. In other words, data product module 215 may be used to implement any type of service that can be installed and instanced directly with platform 202 or as a remotely hosted or called service from a web or cloud-based services provider such as those described herein. In still other examples, aggregator/grid/auction management module 210, marketplace module 220, security/encryption module 222 (i.e., to enable "gatekeeper" functions) can be configured to generate combinations of data models (e.g., auction, grid, marketplace, aggregator, lists, and others) and are not limited to the examples shown and described. As an example, security/encryption module 222 may be invoked when a given requirement(s) is parsed and processed to identify security clearance requirement(s) for a sensitive, confidential, or classified item. Further, security/encryption module 222 may be used to invoke any type of security or encryption algorithms or techniques if client sources 118-120 (FIG. 1) required security or confined access to sensitive information (e.g., classified technical data packages (TDP), or the like). In alternative examples, system 200, platform 202, and the elements described may be varied in design, function, structure, layout, configuration, or implementation and are not limited to the examples shown and described.

Figure 2B:
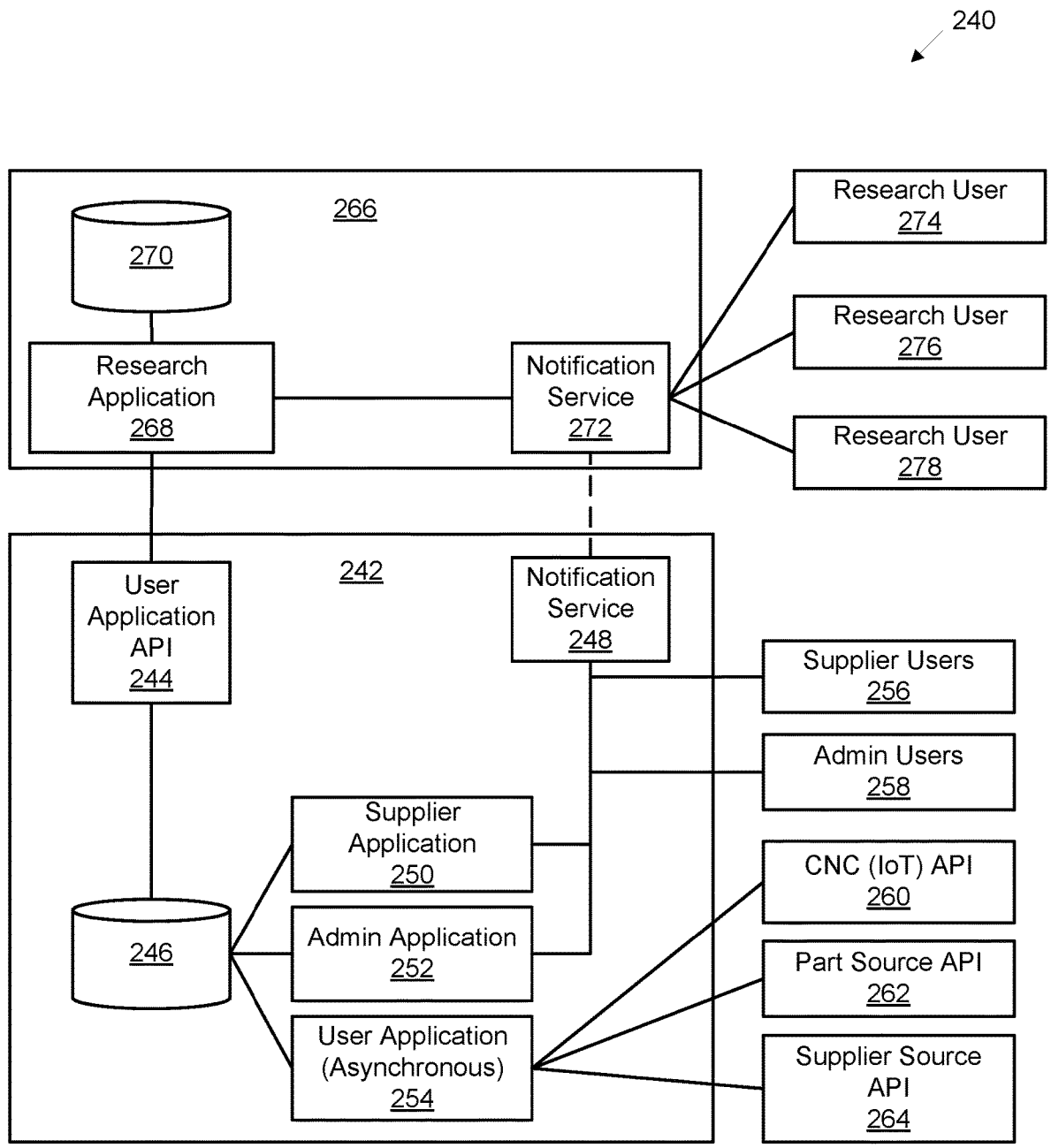
FIG. 2B illustrates an alternative exemplary platform architecture for data-driven requirements analysis and matching.

FIG. 2B illustrates an alternative exemplary system for data-driven requirements analysis and matching. Here, system 240 includes platform 242, which includes user application API 244, data repository 246, notification service 248, supplier application 250, admin application 252, user application (asynchronous) 254, supplier users 256, admin users 258, CNC (IoT) API 260, part source API 262, and supplier source API 264. System 240 also includes client layer 266, which includes research application 268 (i.e., which may be implemented to perform research and searching functions such as those described herein), data repository 270, notification service 272, and manufacturing requirement user 274-278. The quantity, type, configuration, specification, function, design, layout, and implementation of system 240 and elements 242-278 may be varied and are not limited to the examples shown and described.

Here, platform 242 may be implemented using a local, remote, or distributed (e.g., network or cloud-based) topology for one or more of the elements shown and described. In some examples, platform 242 may be configured to receive or transfer data over user application API 244 to client layer 266. Notification service 248, in some examples, may also be configured to transfer data to/from platform 242 and client layer 266. Data repository 246 (and data repository 270) may be implemented using a local, remote, distributed, or hosted (e.g., web, network, cloud, or others) data storage facility that is in data communication with supplier application 250, admin application 252, and user application (asynchronous) 254. Data repositories 246 and 270 may be used to aggregate any type of data associated with suppliers, sources, requirements, contract awards, economic data (e.g., local, regional, state, national, international, foreign, or the like), which can be sorted, processed, and packaged for licensed distribution or sale as a "data product" or the like. Further, data generated by, for example, logic module 212, analytics engine 224, search/AI/algorithmic module 226, and research module 228 may be stored in data repositories 246 and 270. Data stored in repositories 246 and/or 270 may be used for both tactical and strategic reasons such as researching supplier capabilities, capacities, and availability for a given requirement (i.e., tactical) or evaluating data across an industrial base or sector to identify areas of undercapacity or "fragility" (e.g., identifying underproduction of personal protective equipment (PPE) in various regions, states, or countries when a pandemic outbreak occurs, analyzing industrial sectors and bases for production of necessary equipment and/or materiel in support of a national (or local, regional, state, or international) emergency such as war, pandemic (e.g., COVID-19), social unrest, natural catastrophe (e.g., hurricane, wildfire, earthquake, flood, tsunami, or the like), or others). In some examples, notification service 248, supplier application 250, and admin application 252 may be in data communication (direct or indirect) with supplier users 256 and admin users 258. Further, user application (asynchronous) 254 may also be in direct or indirect communication with CNC (IoT) API 260, which may be in further data communication with one or more CNC and/or IoT-enabled machines (not shown).

Referring back to user application (asynchronous) 254, data communication with part source API 262 and supplier source API 264 may be enabled directly or indirectly. As used herein "source" may be used to refer to a data source associated with a parts (i.e., items used to manufacture heavy industry goods) manufacturer or a supplier of an entire heavy industry good, which may have the capabilities and capacities to manufacturing an entire heavy industry good (e.g., a Very Large Cargo Container vessel, a Caterpillar® tractor or "earth mover" (i.e., bulldozer, front loader, and others, without restriction or limitation), a F-35C Lighting II aircraft, a Zumwalt-class guided missile destroyer, a mobile hospital housing structure, a large telecommunications system, a quantum computer, a heavy lift launch vehicle for transporting goods to/from earth orbit, or parts and components thereof, without restriction or limitation). User application (asynchronous) 254 may be in data communication with CNC (IoT) API 260, part source API 262, and supplier source API 264 and configured to receive and/or generate queries to request data that is parsed, processed, and stored (as described above in connection with FIG. 2A) in data repository 246. In some examples, user application (asynchronous) 254 may be configured to be intermittent data communication with CNC (IoT) API 260, part source API 262, and supplier source API 264 (or vice versa). In some examples, CNC (IoT) API 260, part source API 262, and supplier source API 264 may be in data communication intermittently or maintain infrequent data communication with user application (asynchronous) 254, the latter of which being configured to generate queries, request, and transfer data when data communication is reestablished. For example, platform 242 may be used by field workforces (i.e., workforces that are deployed to undeveloped areas or regions where data communication is not readily available) that have intermittent data communication, unreliable access to data networks, or the like. For example, a raw material mining operation for lithium ore may have intermittent data access due to the location of the mine being disposed in a high mountain pass that is far removed from nearby cellular data networks or satellite constellations capable of transmitting data. However, when data access is established, for example, the mine (i.e., a "part source" or "raw material provider" (e.g., raw material provider 122 (FIG. 2A))) may transmit data (e.g., data/signal 238 (FIG. 2A)) to platform 242 and user application (asynchronous) 254 that is configured to invoke processes such as those described above in connection with FIG. 2A and, once other data and attributes are parsed, processed, analyzed, or otherwise retrieved from CNC (IoT) API 260, part source API 262, or supplier source API 264, other data may be transmitted to client layer 266 using notification service 248 or user application API 244.

In some examples, a notification service may be implemented as a distributed function, with both a platform-based element (e.g., notification service 248) and a client-side element (e.g., notification service 272), that is configured to perform research for items that may be used to fulfill a requirement, economic data that may be useful for resource or site planning (i.e., providing information for use by a source to determine not only which supplier, but possibly also a location for procurement, manufacturing, or distribution activities), as well as numerous other issues ranging from available capacity amongst numerous suppliers, raw material pricing and availability, and many others, without restriction or limitation. In other examples, platform 242 and client layer 266 may have notification services provided alternatively as a web or cloud service that is invoked or called using, for example, a web browser or other application interface to a hosted, web, or cloud-oriented services provider (not shown). Referring back to FIG. 2B, notification service 248 may be configured to transfer data from platform 242 (e.g., supplier application 250, admin application 252, user application (asynchronous) 254, supplier users 256, admin users 258, or others) to notification service 272, which in turn is configured to transfer data to research application 268. Notification service 272 may also transfer data to research users 274-278. Data received from notification service 272 and research application 268 may also be stored in data repository 270, which may cache data in order to lower latencies in data transmission times and rates if data communication between client layer 266 and platform 242 is interrupted. Although not shown, client layer 266 and platform 242 may be in data communication (i.e., research application 268 with user application API 244 and notification services 248 and 272) using one or more intermediate data networks or topologies (not shown) such as private or public data networks such as a LAN, WAN, MAN, Internet, or others, without restriction or limitation.

In some examples, one or more of research users 274-278 is generating queries requesting data to research a procurement, manufacturing, or distribution requirement(s) and is using system 240. Generated at client endpoint computing devices (e.g., computers, desktop computers, laptop computers, supercomputers, quantum computers, servers, smartphones, tablet or portable computers, mobile computers, and the like), research users 274-278 may receive data from notification service 272, which may be a rendered display on a user interface of an application, web application, or other program that can be accessed by research users 274-278. Data sent over notification service 272 may be retrieved from repositories 246 and/or 270 by research application 268. For example, previously received and stored data received by research application 268 may be stored in repository 270. Data such as supplier capabilities (e.g., CNC (IoT) machinery, part data, general supplier/source data, and others), capacities, availability, lead times for production/manufacturing, and others may be stored in repository 270, which may be configured to use or implement a data storage protocol or schema similar to that of data repository 246. Supplier data (e.g., data describing attributes generated from analyzing data from supplier users 256, admin users 258, CNC (IoT) API 260, part source API 262, and supplier source API 264) may be stored, retrieved, written, deleted, or modified to data repositories 246 or 270 and, when a query or request is received from research users 274-278, data may be retrieved from research application 268 on client layer 266 or requested and transmitted from platform 242 over user application API 244, from data repository 246. In other examples, data may be transmitted without an initiating query or request from platform 242.

As shown, platform 242 may be updated continuously and/or asynchronously with data from various sources and of multiple types. For example, CNC (IoT) API 260 may be configured to transfer data from different types of CNC machines that are network-capable (i.e., capable of transferring data directly or indirectly across a data network to one or more endpoints), but each of which may use different data types, formats, or protocols. Any type of computer or computing device-controlled machine that is used to manufacture, produce, design, or otherwise make any type of part (i.e., item), entirely or partially, for a heavy industry good may be in data communication with platform 242 using CNC (IoT) API 260. As another example, part source API 262 may be used to transfer data with platform 242 by a client endpoint device (e.g., any type of computing device such as those described above) associated with any entity, individual, or organization providing a source of a given part(s). Data associated with parts may be transmitted to platform 242 using part source API 262, which may be configured to handle various data types, forms, formats, protocols, and schemas, similar to CNC (IoT) API 260 and supplier source API 264, the latter of which may be configured to transfer data similarly. As a further example, data transferred using part source API 262 or supplier source API 264 may also be configured to receive, convert, encode, decode, format, or otherwise modify data from one format to another for use by platform 242 (such as storage or other data operations performed by supplier application 250, admin application 252, user application (asynchronous) 254, or data repository 246 (the latter of which may also include a data management layer or application (not shown) configured to perform data operations on data stored in or retrieved from it)).

Referring back to the earlier example of data sent to research users 274-278 (regardless of whether data is being transmitted in response to a query or is being sent due to an update provided by one or more clients (not shown) transmitting data over CNC (IoT) API 260, part source API 262, or supplier source API 264), data transferred over notification service 272 may also be retrieved or transferred from platform 242. Data repository 246 may be configured, in some examples, to store archived, updated or current supplier, part, and manufacturing equipment (e.g., CNC (IoT)) data, which is updated continuously from various sources (e.g., supplier users 256, admin users 258, clients (e.g., machines, suppliers, part sources; not shown) configured to transfer data continuously or asynchronously to user application (asynchronous) 254) over CNC (IoT) API 260, part source API 262, supplier source API 264, or others). Consequently, data may be stored in data repository 246 and supplier users 256 may access and use supplier application 250 to generate data or signals to be sent over notification services 248 and 272 to client layer 266 and research users 274-278. In some examples, generated data or signals may describe supplier capabilities, capacities, availability, or other attributes that are received in a given data format by platform 242, but transformed (i.e., converted) to another using any type of programming language, format, form, or schema including, but not limited to, any form of structured or unstructured data for storage and retrieval in data repositories 246 or 270, and which can be later transformed for transfer to research users 274-278 in order to render displays on one or more client endpoint devices (not shown). Supplier users 256 use supplier application 250 to configure accounts that can transmit manually, semi-automatically, or automatically data from platform 242 over notification services 248 and 272 to one or more of research users 274-278. Likewise, admin users 258 are configured to manage platform 242 and have the ability to access both supplier application 250 and admin application 252. User application (asynchronous) 254 may be configured for synchronous and asynchronous data transfers from CNC (IoT) API 260, part source API 262, and supplier source API 264. In other examples, supplier users 256, admin users 258, and user application (asynchronous) 254 may be configured differently and are not limited to the examples shown and described.

In some examples, research application 268 may be configured to access, retrieve, query, manage, or perform other data operations on client layer 266, which may include transferring data with research users 274-278 via notification service 272 (using data operations, transformations, and conversions such as those described herein). Data operations performed by research application 268 may also include transferring data with platform 242 and any of elements 244-264. Still further, research application 268 may be a client-side (i.e., hosted on, called by, or implemented with client layer 266) application that is configured to manage, update, retrieve, modify, delete, or add supplier data to data repositories 246 and 270 as well as transfer data with research users 274-278 and platform 242 (using user application API 244).

As shown herein, notification services 248 and 272 are implemented as elements of platform 242 and client layer 266, respectively, and are configured to provide data notification abilities and facilitate data transfer capabilities with research users 274-278 (in the case of notification service 272) and supplier users 256 and admin users 258 (in the case of notification service 248). For example, when a new CNC machine for a given supplier is installed and operational, data may be transmitted to platform 242 via CNC (IoT) API 260, which is transferred to platform 242 using user application (asynchronous). Data for the new CNC machine is then transformed or converted (e.g., from C# to R, RDF, SQL, NoSQL, or other languages, formats, and schemas) and (referencing one or more data models (not shown)) stored in data repository 246. The newly stored data may be detected by platform 242 and a notification is generated and transferred by notification service 248 to notification service 272, which in turn transmits a notification to one or more of research users 274-278. In some examples, a notification may include data that identifies the new CNC machine, its capabilities (e.g., any measured dimension, characteristic, or attribute associated with a given machine or piece of equipment related to its ability to manufacture, fabricate, form, mold, or otherwise create an item or portion thereof), capacities, and availability, or provide a more concise notification that updated information is available regarding a particular supplier and/or machine. In other examples, a notification may be generated by platform 242 and transferred to client layer 266 using notification services 248 and 272. Upon receiving a notification from notification service 272, one or more of research users 274-278 may be configured to transmit a query or request (e.g., a "demand signal") to client layer 266, which invokes research application 268 to request data stored, for example, in data repository 246. Queries and requests, in some examples, of supplier data may be transferred from client layer 266 to platform 242 using user application API 244, which may be configured to transfer, convert, transform, or perform other data operations such as parsing received queries and requests from external clients (e.g., research users 274-278) in order to provide data in a common or usable format by data repository 246 which indicates a specific location or address, file, account, or other data storage schema that may be used to readily locate and transfer to client 266 the requested data. In still other examples, system 240, platform 242, client layer 266, and the elements shown and described may be designed, configured, installed, invoked, called, or implemented differently and are not limited to the examples shown and described, which are provided for purposes of describing novel functional and structural aspects.

Figure 3A:
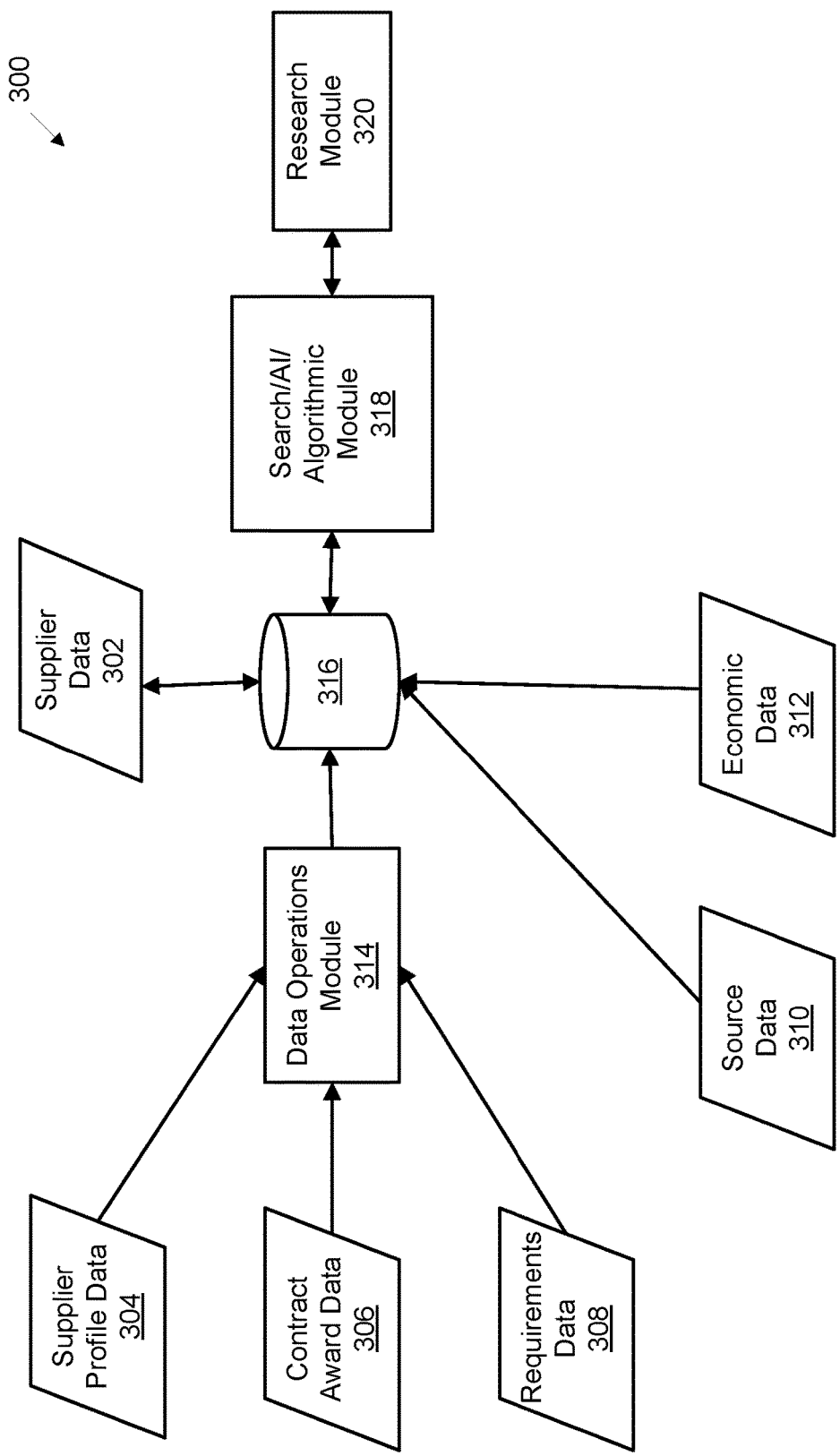
FIG. 3A illustrates an exemplary data flow for data-driven requirements analysis and matching.

FIG. 3A illustrates an exemplary data flow for data-driven requirements analysis and matching. Here, data flow 300 includes supplier data 302, supplier profile data 304, contract award data 306, requirements data 308, source data 310, regional/nation economic data 312, data operations module 314, repository 316, search/AI/algorithmic module 226 318, and research module 320. As used herein (and all drawings and accompanying descriptions in this Detailed Description), like-named and/or like-numbered elements may be similar in function, description, configuration, implementation, or other attributes with little or no variation apart from those provided herein. For example, search/AI/algorithmic module 318 and research module 320 may be similar in function, structure, configuration, implementation, or other attributes to like-named elements search/AI/algorithmic module 226 and research module 228, respectively, of FIG. 2A or research module 268 of FIG. 2B.

Referring back to FIG. 3A, various data flows are shown. Data of various types (e.g., supplier data 302, supplier profile data 304, contract award data 306, requirements data 308, source data 310 (as used herein, "source data" may refer to any data or information originated or transmitted by source clients 118-120 (FIG. 1)), regional/nation economic data 312, or others) may be received and transformed by data operations module 314, which may be similar in function, structure, configuration, or implementation to like-named and numbered elements (e.g., data operations module 208 (FIG. 2A)). For example, data or a signal composed and structured to transmit data (e.g., data/signal 238 (FIG. 2A)) may be received by a platform (e.g., platform 202 (FIG. 2A)) and, once received, may be parsed and evaluated further, for example, by undergoing various types of data operations (e.g., ETL (i.e., extract, transform, load), transformation, analysis, processing, or others such as those identified herein, without limitation or restriction) by data operations module 314. As an example, supplier profile data 302, contract award data 306, and requirements data 308 may be transmitted to platform 202 (FIG. 2A; not shown) and parsed and processed by data operations module 314, which then passes data for further processing and storage in data repository 316.

In some examples, other types of data may also be included in data repository 316, including, but not limited to, supplier data 302 and economic data 312. Supplier data 302 may be in various data types, formats, and schemas, including, but not limited to, R, RDF, SQL, NoSQL, MySQL, and others, without restriction or limitation. Here, supplier data may describe any type of capability, capacity, availability, or other attribute associated with one or more suppliers (not shown) that are in data communication with data repository 316. In other examples, economic data 312 may be data obtained from a variety of sources and analyzed by search/AI/algorithmic module 318, research module 320, or other modules, applications, or services (e.g., logic module 212 (FIG. 2A), analytics engine 224 (FIG. 2A), or others) in order to generate and/or present data flows associated with local, regional, state/provincial, federal/national, or international economic forecasting, trend analysis, gap identification (i.e., "spotting") within, for example, supply chains, logistical systems, critical supplies infrastructure, and the like. For example, the critical procurement, manufacturing, and distribution of vaccines for combatting viruses such as COVID-19 and variants thereof may be enhanced, accelerated, or otherwise supported by identifying critical supply chain over or underutilization (i.e., areas where procurement, manufacturing, or distribution capabilities, capacities, or other attributes can be identified) and thus routing economic data 312 and supplier data associated with over or under utilizations to source clients (e.g., source clients 118-120 (FIG. 1)) that can be used to identify potential suppliers to rapidly contract for procurement, manufacturing, and/or distribution. Another example of data flow 300 enabled by platform 202 (FIG. 2A) may include source clients 118-120 (FIG. 1) searching for suppliers capable of manufacturing heavy industry goods or infrastructure by sending data (e.g., a demand signal such as data/signal 238 (FIG. 2A)) to research module 320, generating another data, signal, or instruction to search/AI/algorithmic module 318. Search/AI/algorithmic module 318 then generates a query or request to data repository 316 (or a data management or database management system or layer thereto) to retrieve supplier data 302, economic data 312, and other data parsed and processed from supplier profile data 304, contract award data 306, and requirements data 308. An originating source (not shown) may have provided input (e.g., source data 310) directly or indirectly (i.e., requirements data 308 after being parsed and processed by data operations module 314) to data repository 316.

In some examples, a query or request of data repository 316 may also include contract award data of current or past awarded contracts to a given supplier, which may be further analyzed by search/AI/algorithmic module 318 and research module 320 to determine whether data associated with attributes of these current or past contracts match those parsed from requirements data 308. Likewise, supplier profile data 304 may also be parsed and processed by data operations module 314 to determine other attributes not already transferred, transformed, converted, formatted, and/or stored directly or indirectly to data repository 316. In some examples, supplier data 302 may be provided by suppliers while supplier profile data 304 may include data associated with a supplier that is provided by other sources. In still other examples, suppliers may provide both supplier data 302 and supplier profile data 304, either directly or indirectly. In yet other examples, data flow 300 and the data types, flows, and elements shown may be varied and are not limited to the examples shown and described.

Figure 3B:
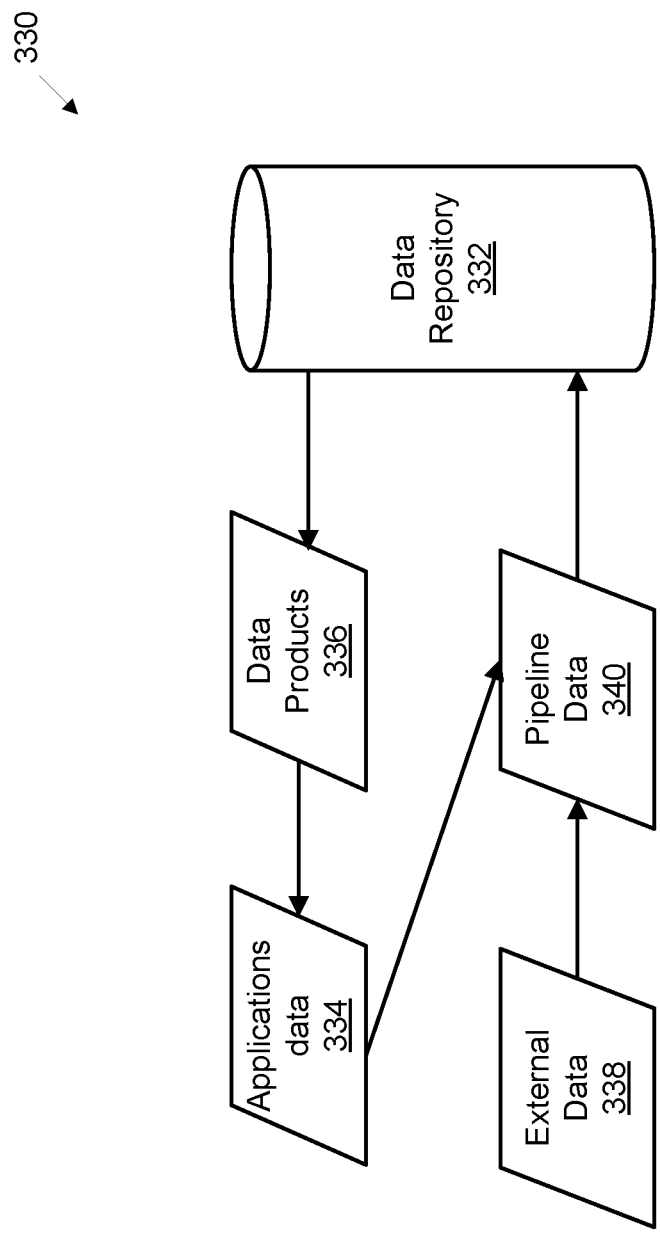
FIG. 3B illustrates another exemplary data flow for data-driven requirements analysis and matching.

FIG. 3B illustrates another exemplary data flow for data-driven requirements analysis and matching. Here, data flow 330 shows data repository 332, which may be configured to store various data types including, but not limited to applications data 334, data products 336, external data 336, and pipeline data 340. Other data types and flows may be used or implemented and are not limited to those shown and described, which are provided for purposes of exemplary explanation. The number, type, size, and shape of data flow 300 and elements 332-340, as well those of all drawings described herein, may be varied and are not intended to be limiting in design, function, structure, or implementation of the disclosed techniques. As shown, data repository 332 may be configured to perform data operations to receive, store, add, delete, query (e.g., perform GET requests, or other operations to retrieve data from data repository 332), or modify data stored within it. Data repository 332 may be implemented using various types of data schemas, formats, and protocols and is not limited to the use of a single instance, but may be implemented using multiple instances, without restriction or limitation. Further, data models (not shown) may be stored in data repository 332 and used to map data received, stored, accessed, or the like. Still further, in addition to storing data models (not shown), data repository 332 may also be configured to store one or more domain models (not shown), which may be used by various types of data products (e.g., search, matching, ranking, data analytics, and other types of services that may be invoked, called, or otherwise), which is depicted as data products 336.

Data flow 330, as shown, illustrates an exemplary data flow through platform 202 (FIG. 2A) or a variant thereof. Here, data repository 332 is configured to store external data 338 that is received along with pipeline data 340. In some examples, external data 338 may be any data regardless of type, form, format, structure, schema, or protocol, but intended to be stored in data repository 332. External data 338 may be combined with pipeline data 340 (i.e., any data that originates or emanates from one or more elements of platform 202 (FIG. 2), which may include data in different types, forms, or formats that are generated from analytics, processing (e.g., the output of logic module 212 (FIG. 2A), analytics engine 224 (FIG. 2A), search/AI/algorithmic module 226 (FIG. 2A), or the like), or other data operations performed by one or more modules of platform 202. External data 338 and pipeline data 340 may be stored, accessed, added, deleted, or otherwise modified in data repository 332, which is configured to manage, store, and perform other data operations. As shown, data may be queried and retrieved from data repository 332 and used to provide data to data products 336 and applications (i.e., applications data 334), the latter of which may generate other data that is returned as pipeline data 340. Data flow 330 and elements 332-340 may be used to generate data that may be packaged or encapsulated as a "digital chain of custody" that identifies the material, manufacturing, processes, pricing, and finishing actions associated with an item and, which may be used in later queries to provide highly relevant data associated with future requirement(s) for the same or similar part. In other examples, data flow 330 and the elements shown and described may be varied and are not limited to the examples provided herein.

Figure 4:
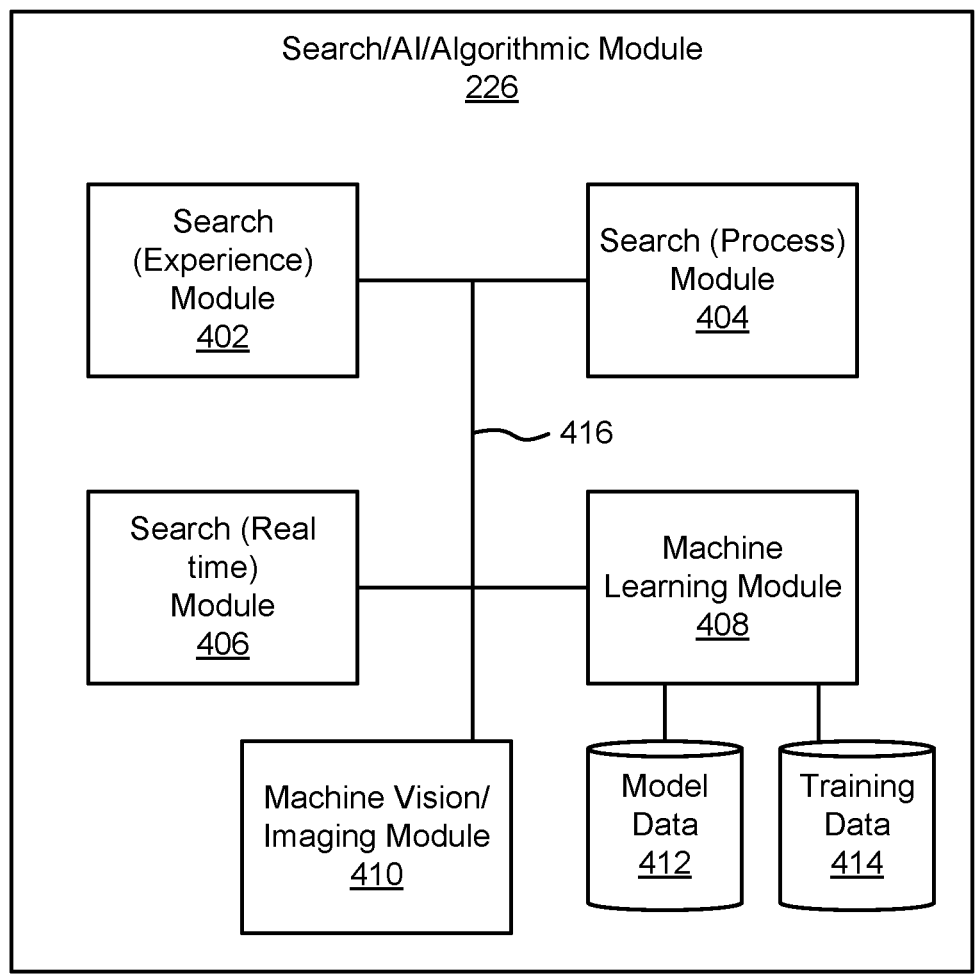
FIG. 4 illustrates an exemplary module for data-driven requirements analysis and matching.

FIG. 4 illustrates an exemplary module for data-driven requirements analysis and matching. Here, an example of search/AI/algorithmic module 226 (FIG. 2A) is shown and described in greater detail, including search (experience) module 402, search (process) module 404, search (real time) module 406, machine learning module 408, machine vision/imaging module 410, model data 412, training data 414, all of which are configured to exchange, transfer, or be in data communication using data bus 416. In some examples, search/AI/algorithmic module 226 may be implemented with one or more elements or modules (e.g., search (experience) module 402, search (process) module 404, search (real time) module 406, machine learning module 408, machine vision/imaging module 410, or others), which are configured to provide search, matching, ranking, and other analytical and processing functions on requirements, supplier, part, economic, and other types of data input to platform 202 (FIG. 2A).

Referring back to FIG. 4, search/AI/algorithmic module 226 (FIG. 2A) may have different types of search algorithms or parameters. In some examples, search algorithms may be implemented to analyze and evaluate supplier data to identify (used interchangeably herein with "determine") attributes and data indicative of experience associated with a given supplier for a particular part or good using, for example, search (experience) module 402. Here, search (experience) module 402 may also be configured to analyze and evaluate data (e.g., catalog of parts information, supplier historical data of manufacturing experience with a part or similarities thereto) associated with a requirement from one or more of source clients 118-120 (FIG. 1) to determine attributes associated with experience of source clients 118-120 (FIG. 1) with a given requirement(s) or part(s). For example, a user of a supplier client account (e.g., supplier user 256 (FIG. 2B)) may wish to determine the experience level of a given source (e.g., source clients 118-120 (FIG. 1), which may be useful in bidding on a series of contracts or multiple disparate contracts. Search (experience) module 402 may also be configured to determine other experience-related attributes and data such as personnel training and experience with a given type of machine sought for a particular part (e.g., length of time that one or more suppliers may have been using a particular type of 3-D printer or 3-D printing technology or process, length of time or type of experience with a particular type of milling machine or lathe, and the like). In other examples, search (experience) module 402 may be configured to search, using one or more search algorithms, to find and identify various types, forms, or formats of data sought.

Referring back to FIG. 4, other types of search functionality may be implemented with search/AI/algorithmic module 226 (FIG. 2A), including search (process) module 404. Here, search (process) module 404 may be configured to search data associated with encoded part (item) machining requirements, encoded machining abilities, tolerances, operating characteristics, and other capabilities and capacities. This data may be transferred to a ranking algorithm (not shown) that can perform a ranking, for example, based on the manufacturing requirements for a given part as measured against a given supplier(s) machines and data describing capabilities, capacities, availability, and the like.

As another example, a particular type of procurement, manufacturing, or distribution process may be indicated by a requirement(s). When the requirement(s) undergo ingestion, ETL operations, analysis, and processing as described above, attributes are identified and data associated with the determined attributes (i.e., "attribute data") are generated and used by search (process) module 404 to query one or more data repositories (e.g., data repositories 218 and 234 (FIG. 2A)) to generate matches and ranks of suppliers that perform or have experience with the desired processes. As another example, a requirement(s) search may be performed to match updated, current, near (i.e., substantially) real time, or real time data from suppliers for a given requirement(s) using search (real time) module 406.

In some examples, search (real time) module 406 may be configured to evaluate data received over data bus 416 in order to generate a ranking of supplier(s) based on current availability, which may be combined with generated rankings from one or more of search (experience) module 402, search (process) module 404, machine learning module 408, and/or machine vision/imaging module 410. In some examples, search (real time) module 406 may be configured to evaluate data that is used by machine learning module 408 to algorithmically evaluate and process data from CNC (IoT)-enabled equipment and machinery in relation to demand for items capable of being manufactured by such. IoT-enabled machinery associated with supplier(s) in data communication with, for example, platform 202 may be identified from data input to search (real time) module 406.

In other examples, algorithms and data processing techniques such as machine vision, machine learning, and others may also be used to enhance or improve resultant data generated by one or more of search (experience) module 402, search (process) module 404, search (real time) module 406. Here, machine vision/imaging module 410 may be used to generate data and attributes associated with a requirement by receiving an image (e.g., digital representation, digital photo, smart phone image, or any other type of optical or digitally-generated representation) of a part and performing processing (on the image) to determine dimensions, material composition, features (e.g., mechanical, electrical, optical, or others), manufacturing equipment and processes, and other features or aspects. Using machine vision and imaging algorithms, machine vision/imaging module 410 may be configured to receive data (or a copy thereof) transferred over data bus 416 from one or more other modules (e.g., search (experience) module 402, search (process) module 404, search (real time) module 406) and generate data and attributes associated with images parsed from the data transferred. For example, a requirement(s) for a part may include an image and data from one or more of search (experience) module 402, search (process) module 404, search (real time) module 406 may result in other images of parts that may be similar to the one described by a requirement. Using machine vision/imaging module 410, algorithmic processing may be performed to determine whether the data associated with potential suppliers suitable for a given requirement have machinery, equipment, or processes suitable for manufacturing similar or the same part(s). Various types of machine vision, vision systems, and imaging algorithms, processes, or techniques may be used, individually or in combination, by machine vision/imaging module 410. Single or multi-dimensional (e.g., 1, 2, or 3-dimensional), multispectral, hyperspectral, line scan, edge detection, segmentation, blob detection and extraction, pattern recognition, computer vision, and others may be used and are not limited to any specific type, version, or implementation.

In other examples, machine learning module 408 may be used to analyze and process data transferred from one or more of search (experience) module 402, search (process) module 404, search (real time) module 406, and machine vision/imaging module 410 over data bus 416. Using any type of machine learning algorithms such as deep learning, neural networks, and others, regardless of whether supervised, unsupervised, or semi-supervised learning techniques are implemented, machine learning module 408 may be configured to perform matching, ranking, and other analytical operations on data queried and retrieved from data repositories (e.g., data repositories 104-106 (FIG. 1), data repositories 218, 234 (FIG. 2A), or others). Machine learning module 408 may also be trained to perform matching, ranking, or other analytical data operations (i.e., predictive or otherwise) in order to associate attribute data of a requirement to attribute data of one or more potential suppliers, as well as other features and functions. For example, machine learning module 408 (as well as search/AI/algorithmic module 226 overall) may be configured to generate predictive success rates for various suppliers, which may be used as data or an attribute to not only match suppliers to a given requirement(s), but also to rank them.

In some examples, using models stored in model data repository 412 and training data repository 414 (both of which may be implemented using single, standalone, networked, cloud-based, multiple, or other types and topologies of data storage implementations), machine learning module 408 may be trained to generate highly accurate matches and rankings of suppliers suitable for a given requirement or set of requirements. Using model data 412, machine learning algorithms and/or machine learning techniques may be executed within the operating environment of search/AI/algorithmic module 226 to not only generate matches and ranks of supplier data and attributes to requirement(s), but to also generate increasingly accurate, efficient, and fast results that improve as subsequent data operations (e.g., matching, ranking, selection, and others, without restriction or limitation) are performed. Similarly, training data 414 may be used for similar purposes, but may also include an initial set of data that is used to train machine learning module 408 prior to performing an initial or first data operation. Training data, in some examples, may be any type, form, format, schema, or structure of data that may be parsed, processed, and resolved to a common data format for use in performing data operations by machine learning module 408 or other modules. Additionally, model data 412 and training data 414 are continuously adjusted as data operations and machine learning algorithm module 408 runs, adding, changing, or deleting model data and training data in model data 412 and training data 414, respectively. Machine learning module 408 may be implemented as an element of search/AI/algorithmic module 226 (FIG. 2A), which may be in direct or indirect data communication with search (experience) module 402, search (process) module 404, search (real time) module 406, and machine vision/imaging module 410 over data bus 416. In other examples, machine learning module 408 may also be implemented as a web, hosted, or cloud-based service called (i.e., invoked) from another application or platform (e.g., host/platform service 132 (FIG. 1)). In still other examples, search/AI/algorithmic module 226 and elements 402-416 may be varied and are not limited to any of the descriptions, configurations, layouts, functions, or structures shown and described.

Figure 5:
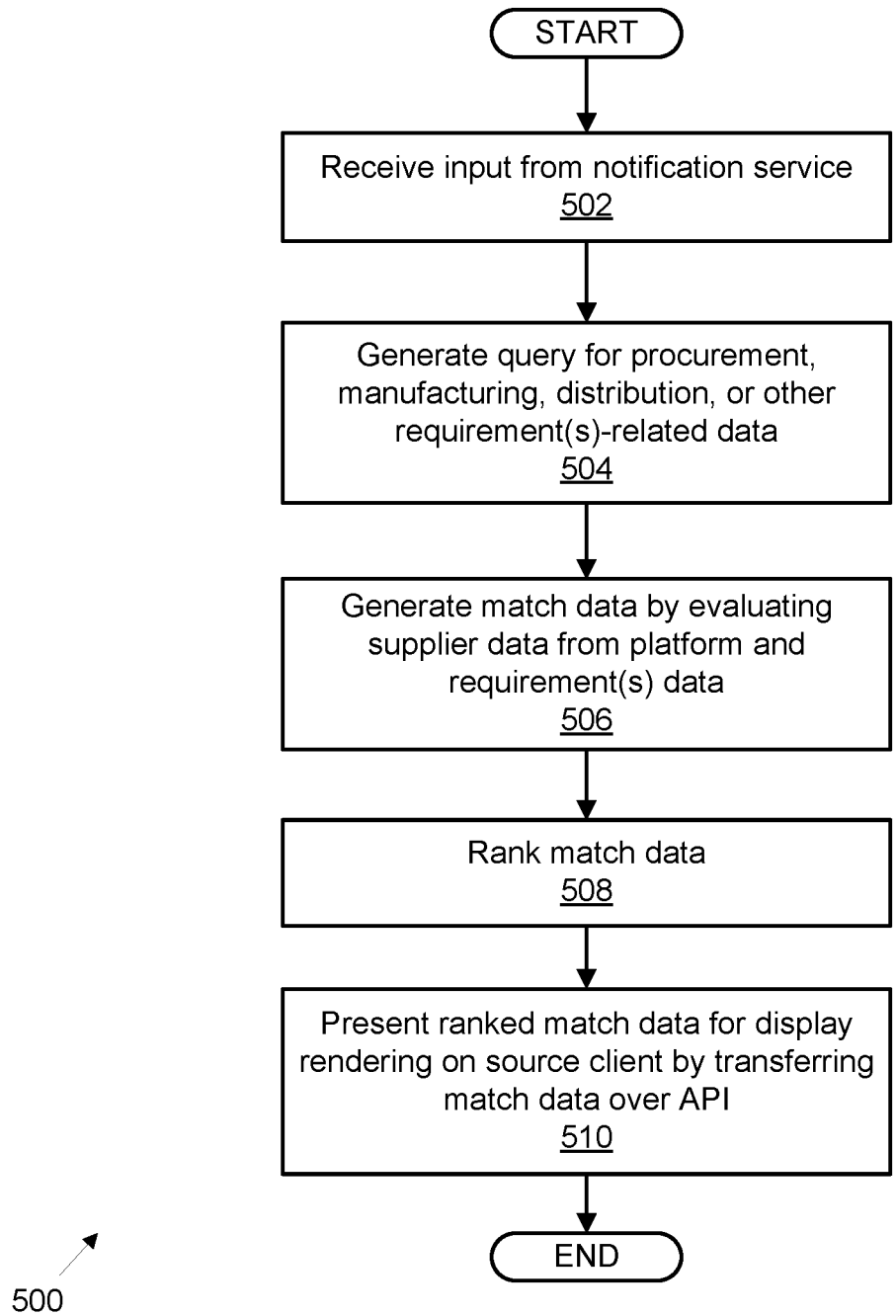
FIG. 5 illustrates an exemplary process for data-driven requirements analysis and matching.

FIG. 5 illustrates an exemplary process for data-driven requirements analysis and matching. Here, process 500 starts by receiving an input from a notification service (e.g., notification services 248 and 272 (FIG. 2B) (502). Next, a query is generated requesting procurement, manufacturing, distribution, and requirement(s)-related data (504). Match data is generated by evaluating data from a platform (e.g., platform 102 (FIG. 1), platform 202 (FIG. 2A), platform 242 (FIG. 2B), or the like) (506). Using match data, a ranking is generated of potential suppliers having capabilities, capacities, availability, pricing, location, or other characteristics (e.g., small business or other preferences) to procure, manufacture, or distribute an item (508). The ranked match data is processed, formatted, and transferred using an API (e.g., APIs 110-114 (FIG. 1), API/Gateway module 230 (FIG. 2A), user application API 244 (FIG. 2B), or the like) to one or more client endpoint devices (e.g., source clients 118-120 (FIG. 1), supplier clients 124-128 (FIG. 1), supplier users 256 (FIG. 2B), admin users 258 (FIG. 2B), research users 274-278 (FIG. 2B), or others) to be rendered/displayed (510). In other examples, process 500 may be varied in order, operation, design, configuration, or other aspects and is not limited to the example shown and described.

Figure 6:
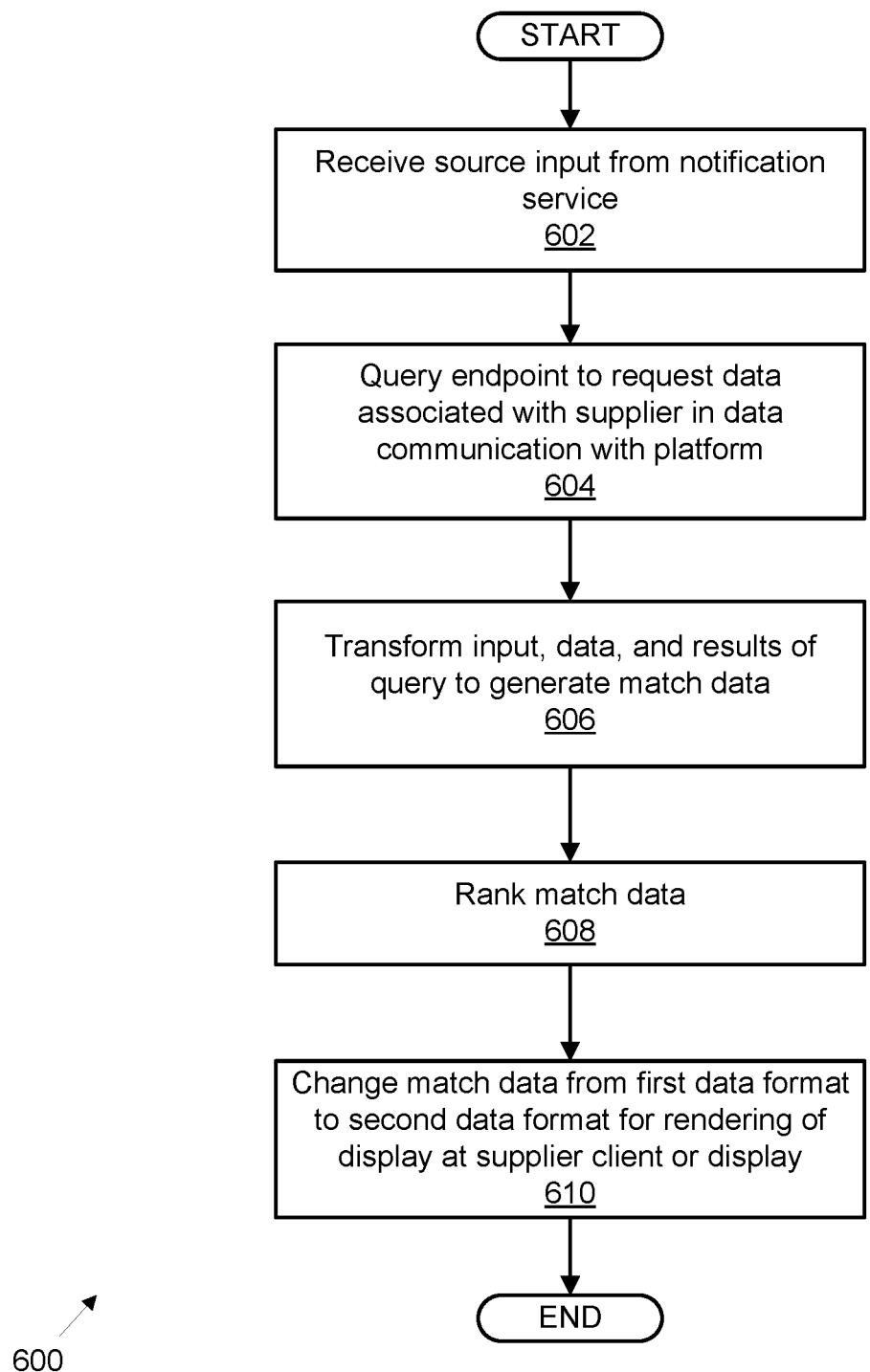
FIG. 6 illustrates another exemplary process for data-driven requirements analysis and matching.

FIG. 6 illustrates another exemplary process for data-driven requirements analysis and matching. Here, process 600 starts by receiving data from a notification service (e.g., notification service 248 and 272 (FIG. 2B), or the like) (602). Next, a query is generated by a source (e.g., source clients 118-120 (FIG. 1)) and sent (i.e., data transfer) to one or more endpoints (e.g., supplier clients 124-128 (FIG. 1), raw material provider 122 (FIG. 1), or the like) requesting data associated with capabilities, capacities, availability, or other information relevant to a requirement(s) (604). Data operations to transform data associated with the input (e.g., demand signal) initiating the query and any resultant (i.e., responsive) data received by platform 202 (FIG. 2A) in response to the query are performed in order to match resolved attribute data (606). Using techniques such as those described herein (e.g., search/AI/algorithmic module 226 (FIG. 2A)), matches are ranked using the transformed data of the input for the initial query and any resultant (i.e., responsive) data received (608). After processing the input data (e.g., requirement(s) data and attributes) and responsive data received from a query to one or more suppliers, ranked, matched data is further transformed (i.e., converted, formatted, mapped, or otherwise modified from a first format to a second format) in order to generate further data for rendering a display on one or more client endpoint devices (i.e., computing devices used at a client node or device by a requirement source) (610). In some examples, a display may be a ranked and ordered list of matched suppliers to requirement(s) set forth by source clients 118-120 (FIG. 1) in order to procure, manufacture, distribute, or otherwise obtain (directly or indirectly) and item in fulfillment of a heavy industry good, service, or product-related contract or agreement. In other examples, process 600 may be varied in order, operation, design, configuration, or other aspects and is not limited to the example shown and described.

Figure 7:
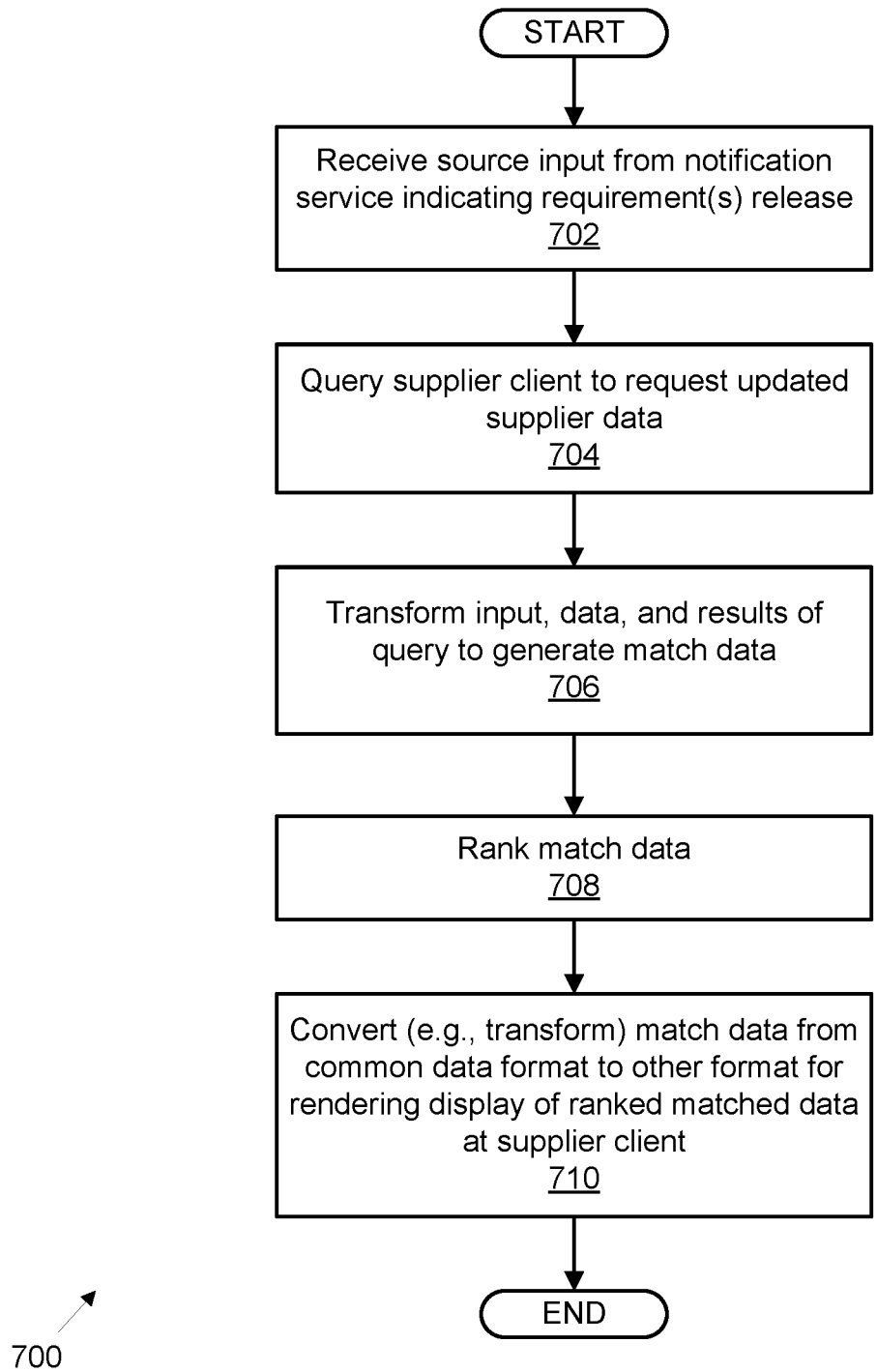
FIG. 7 illustrates a further exemplary process for data-driven requirements analysis and matching.

FIG. 7 illustrates a further exemplary process for data-driven requirements analysis and matching. Here, process 700 begins by receiving a source input (e.g., a demand signal, data/signal 238 (FIG. 2A), or data or a signal from one or more source clients 118-120 (FIG. 1), or others) from a notification service indicating a requirement(s) has been released (702). Next, platform 202 (FIG. 2A) generates a query to supplier clients 124-128 (FIG. 1) requesting updated supplier data, which may include, but is not limited to, information about machines (e.g., CNC, IoT, networked, standalone, and others) associated with, used by, installed at, or otherwise accessible by one or more suppliers (704). Once responsive data has been received as input to platform 202 (FIG. 2A), data operations to transform source data (i.e., data associated with a requirement(s)) and supplier data (e.g., data transmitted in response to the query) can be performed using processes and techniques such as those described herein (706). After source and supplier data have been transformed (e.g., converted, formatted, or otherwise subjected to data operations that convert data from initial formats to one in which other data and attributes in a common format are generated), matching data operations may be performed to match requirement(s) to suppliers based on procurement, manufacturing, and distribution capabilities, capacities, and availabilities. Further, after completing matching data operations of data and attributes of requirement(s) to supplier(s), further data operations may be performed to rank generated matches (708). Upon completing a ranking or set of rankings (which may be performed for various characteristics and attributes specified in a requirement or set of requirements), data used to render a display of the ranked matched data may be converted from a common data format (e.g., R, RDF, SQL, NoSQL, MySQL, or any other structured or unstructured data format) to a separate format for presentation on one or more displays disposed at supplier clients 124-128 (FIG. 1) (710). In other examples, process 700 may be varied in order, operation, design, configuration, or other aspects and is not limited to the example shown and described.

Figure 8:
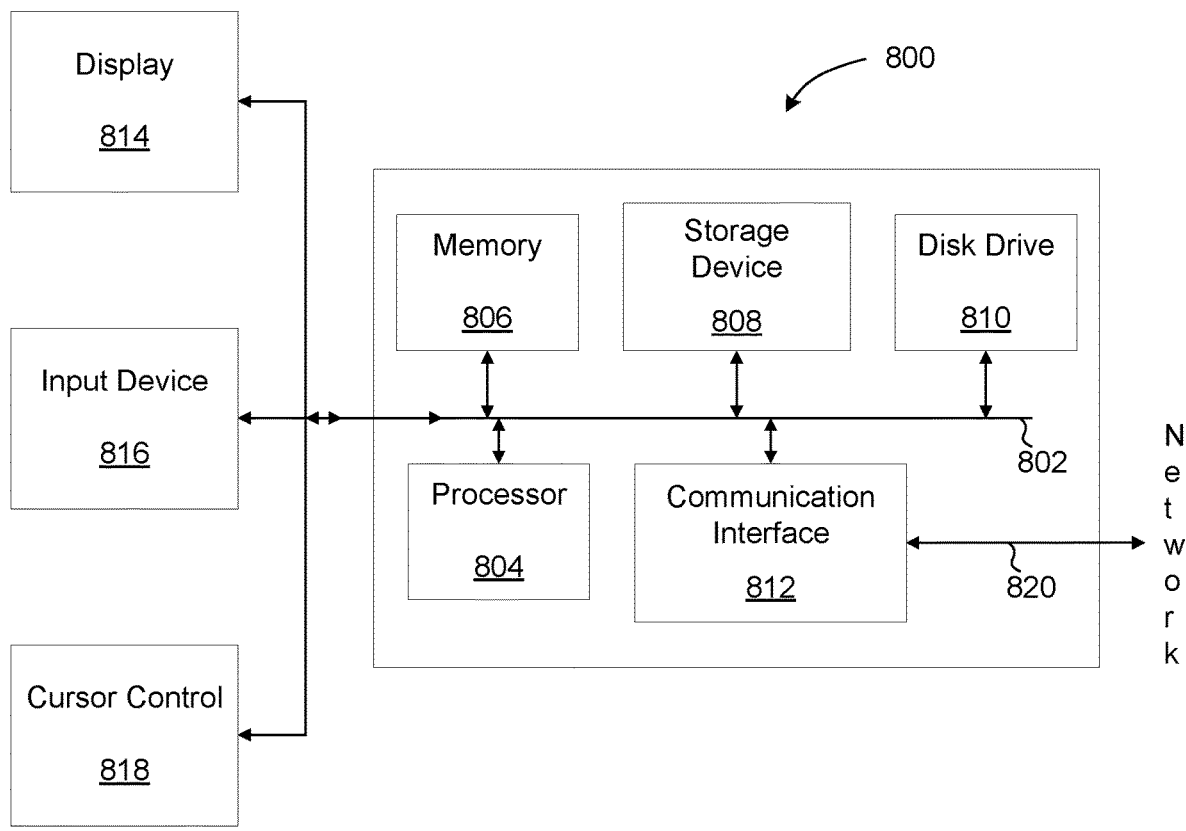
FIG. 8 illustrates an exemplary computing system suitable for data-driven requirements analysis and matching.

FIG. 8 illustrates an exemplary computing system suitable for data-driven requirements analysis and matching. Here, system 800 illustrates an exemplary computing system suitable for data-drive requirement analysis and matching. In some examples, computer system 800 may be used to implement computer programs, applications, methods, processes, or other software to perform the above-described techniques. Computing system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), cursor control 818 (e.g., mouse or trackball), communication link 820, and network 822.

According to some examples, computing system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks, such as disk drive 810. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by a single computer system 800. According to some examples, two or more computing system 800 coupled by communication link 820 (e.g., LAN, PSTN, or wireless network) may perform the sequence of instructions in coordination with one another. Computing system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described techniques are not limited to the details provided. There are many alternative ways of implementing the above-described invention techniques. The disclosed examples are illustrative and not restrictive.

What is claimed:

1. A system, comprising:
a database configured to store a first set of data associated with an input received from a notification service in data communication with a platform hosted in association with a cloud computing data network with one or more clients and one or more CNC-enabled machines in data communication with the platform the notification service being configured to identify manufacturing capabilities of the one or more CNC-enabled machines; and
a processor configured to execute one or more program instructions associated with a cloud the platform hosted in association with the cloud computing data network and configured to receive the input using an application programming interface configured to transfer the first set of data between the platform and the one or more clients using the cloud computing data network, to generate a call to a machine learning module disposed an algorithmic module including, the machine learning module comprising one or more machine learning algorithms configured to analyze an image of an item to automatically determine one or more attributes and features of the item to perform matching and ranking of a pool of vendors, the attributes and features being configured as transformed data input from a data format used to transfer data over the cloud computing data network to another data format used by the one or more CNC-enabled machines to manufacture the item, the attributes and features being communicated in the another data format from the platform over the cloud computing data network to at least one of the one or more of the CNC-enabled machines to manufacture the item, to query the database or one or more other databases in response to the input to request a second set of data associated with one or more machines configured to manufacture at least a portion of the item, at least one of the database and the one or more databases being in data communication with the platform, to generate match data by evaluating the first set of data, the second set of data, and a requirement comprising one or more attributes used to identify one or more vendors using a search algorithmic module of the platform, each of the one or more vendors being identified using a file retrieved from the database or the one or more other databases in response to a query sent to the platform hosted in association with the cloud computing data network, the file including a third set of data associated with an attribute value of the each of the one or more vendors and the attribute value being used by the one or more machine learning algorithms to match at least one of the one or more vendors to the requirement, to rank the match data, and to present the match data after the ranking, the match data being sent by the platform over the application programming interface to the notification service and a display, wherein the algorithmic module is configured to implement a machine vision/imaging algorithmic module configured to receive a digitized image of the item and use the digitized image of the item to automatically determine one or more of a dimension and a material composition of the item as a subset of attributes values to determine automatically a vendor of the one or more vendors that is associated with a CNC-enabled machine that is suitable to manufacture or process the item based on the attribute value of the vendor associated with the CNC-enable machine specifying a manufacturing capability and an automatic determination of the dimension and the material composition to match the manufacturing capability, wherein the requirement is configured to cause the processor to generate a data signal to cause distribution or transportation of the item.

2. The system of claim 1, further comprising a search module configured to identify one or more vendor records having a value, the value being used by the algorithmic module to generate the match data.

3. The system of claim 1, further comprising a search module configured to identify one or more vendor records by querying a repository to identify a fourth set of data associated with a supplier having experience that matches the requirement when the third set of data is analyzed by the algorithmic module.

4. The system of claim 1, further comprising a search module configured to identify one or more vendor records indicating prior experience with a procurement process associated with the item, the procurement process being matched to a requirement when the third set of data is processed by the algorithmic module.

5. The system of claim 1, wherein the algorithmic module comprises a machine learning algorithm trained using training data queried from another database, the training data being used to train the machine learning algorithm to match at least one of the one or more vendors to the requirement when the third set of data is processed by the algorithmic module.

6. The system of claim 1, wherein the input comprises an attribute associated with procurement of the item, the attribute being transmitted by another system associated with a vendor, the attribute, when processed by the algorithmic module, being used to identify the vendor as a source to procure the item.

7. The system of claim 1, wherein the input comprises distribution data associated with the item, the distribution data being transmitted by another system associated with at least one of the one or more vendors.

8. The system of claim 1, wherein the match data further comprises financial data associated with the item.

9. The system of claim 1, wherein the vendor record comprises data associated with the one or more machines, at least one of the one or more machines being a computer numerical control machine.

10. The system of claim 1, wherein the processor is configured to query the database or the one or more other databases in response to the input of the requirement associated with a procurement process associated with the item.

11. The system of claim 1, wherein the processor is configured to query the database or the one or more other databases in response to the input of the requirement associated with a distribution process associated with the item.

12. A system, comprising:
a data repository configured to store an input from a notification service using a data network, the input including data associated with a requirement used to manufacture an item using one or more CNC-enabled machines in data communication with the data repository over the data network, the notification service being configured to identify manufacturing capabilities of the one or more CNC-enabled machines; and
an analytics engine to execute one or more program instructions associated with a cloud computing platform hosted in association with the data network and configured to receive the input from the notification service in association with the data network using an application programming interface, the requirement being generated by an application configured to identify one or more attributes associated with the item, the analytics engine being configure to call a machine learning module disposed an algorithmic module including, the machine learning module comprising a machine learning algorithm configured to analyze an image of an item to automatically determine one or more attributes and features of the item to perform matching and ranking of a pool of vendors, the attributes and features being configured as transformed data input from a data format used to transfer data over the cloud computing data network to another data format used by the one or more CNC-enabled machines to manufacture the item, the attributes and features being communicated in the another data format from the platform over the cloud computing data network to at least one of the one or more of the CNC-enabled machines to manufacture the item;
a search module configured to generate a query configured to be transmitted by a platform to an endpoint in response to the input, the input being associated with one or more machines in data communication with the platform;
a first logic module configured to transform the input, the data, and a result from a data format to another data format using one or more algorithmic modules of the platform to generate match data identifying a vendor record in the data repository if the match data is at least equal to a numerical threshold, the first logic module also being configured, using another machine learning algorithm hosted on the first logic module, to rank the match data if the match data indicates the vendor record is at least equal to the numerical threshold, the first logic module further configured to implement a machine vision/imaging algorithmic module configured to receive a digitized image of the item and use the digitized image of the item to automatically determine one or more of a dimension and a material composition of the item as a subset of attributes of the one or more attributes to determine automatically a vendor is associated with a CNC-enabled machine specifying a manufacturing capability that is suitable to manufacture or process the item based on the attribute value of the vendor associated with the CNC-enable machine and an automatic determination of the dimension and the material composition to match the manufacturing capability; and
a second logic module configured to transform the match data from the another data format to a further data format, the further data format being used to render a display of resultant data generated by the second logic module and transmitted by the platform using the application programming interface to the notification service to be presented on a display, wherein the requirement is configured to cause the processor to generate a data signal to cause distribution or transportation of the item.

13. The system of claim 12, wherein the platform is configured to receive, transform, and transfer data between at least the search module, the first logic module, the second logic module, and the data repository.

14. The system of claim 12, wherein a cloud computing service is used to implement the data repository, the analytics engine, the search module, the first logic module, and the second logic module.

15. The system of claim 12, wherein at least one of the one or more machines is a computer numerical control machine configured to transfer data with the notification service, the application, and the platform.

16. The system of claim 12, wherein the second logic module comprises one or more machine learning algorithms, each of the one or more machine learning algorithms being trained using data from the data repository.

17. The system of claim 12, wherein the platform is in data communication with the application, a client in data communication with the cloud computing platform, and another system, the another system being configured to transfer control data from the platform to at least one of the one or more machines.

18. A system, comprising:
 a data facility configured to store an input from a notification service using a data network, the input including data associated with a requirement of an item, one or more clients being in data communication with the notification service and one or more CNC-enabled machines, the notification service being configured to identify manufacturing capabilities of the one or more CNC-enabled machines; and
 a cloud computing service platform hosted in association with the data network and comprising one or more program instructions and, when the one or more program instructions are executed, configured to receive the input from the notification service in association with the data network using an application programming interface, to call a machine learning module disposed an algorithmic module including, the machine learning module comprising one or more machine learning algorithms configured to analyze an image of an item to automatically determine one or more attributes and features of the item to perform matching and ranking of a pool of vendors, the attributes and features being transformed from a data format used to transfer data over the cloud computing data network to another data format used by the one or more CNC-enabled machines to manufacture the item, the attributes and features being communicated in the another data format from the platform over the cloud computing data network to at least one of the one or more of the CNC-enabled machines to manufacture the item, the requirement being generated by an application configured to identify one or more attributes associated with the item, to query an endpoint in response to the input, the input being associated with one or more machines, to analyze the input, the data, and a response to the query using one or more logic modules including the one or more machine learning algorithms implemented with the platform to generate match data configured to identify a vendor, to rank the match data, and to transform the match data from a first format to a second format, the second format being used to render a display of resultant data generated by analyzing the match data and transmitting the resultant data from the platform using the notification service to be presented on a display, wherein at least one logic module of the one or more logic modules is configured to implement a machine vision/imaging algorithmic module to receive a digitized image of the item and use the digitized image of the item to automatically determine one or more of a dimension and a material composition of the item as a subset of attributes values to determine automatically the vendor suitable to manufacture or process the item based on the attribute value of the vendor associated with the CNC-enable machine specifying a manufacturing capability and an automatic determination of the dimension and the material composition to match the manufacturing capability, wherein the requirement is configured to cause the processor to generate a data signal to cause distribution or transportation of the item.

\* \* \* \* \*